US012501427B2

(12) United States Patent
Yang et al.

(10) Patent No.: US 12,501,427 B2
(45) Date of Patent: Dec. 16, 2025

(54) UPLINK TRANSMISSION HANDLING AFTER A BANDWIDTH PART SWITCH FOR DYNAMIC UPLINK SKIPPING

(71) Applicant: QUALCOMM Incorporated, San Diego, CA (US)

(72) Inventors: Xinjie Yang, La Jolla, CA (US); Hemant Sharma, Hyderabad (IN); Sai Lokesh Ladhagiri Krishnakumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 18/303,094

(22) Filed: Apr. 19, 2023

(65) Prior Publication Data

US 2024/0357581 A1 Oct. 24, 2024

(51) Int. Cl.
*H04W 72/1268* (2023.01)
*H04L 5/00* (2006.01)
(Continued)

(52) U.S. Cl.
CPC ... *H04W 72/1268* (2013.01); *H04W 72/0457* (2023.01); *H04W 72/23* (2023.01); *H04L 5/0048* (2013.01)

(58) Field of Classification Search
CPC ......... H04W 72/1268; H04W 72/0457; H04W 72/23; H04L 5/0048; H04L 5/001; H04L 5/0053; H04L 5/0098
(Continued)

(56) References Cited

U.S. PATENT DOCUMENTS

2021/0219154 A1* 7/2021 Han ...................... H04W 76/27
2023/0092921 A1 3/2023 Chin et al.
2024/0107428 A1* 3/2024 Hoshino ................ H04L 5/001

FOREIGN PATENT DOCUMENTS

WO WO-2022143755 A1 7/2022

OTHER PUBLICATIONS

CATT: "Further Consideration on BWP Inactivity Timer", 3GPP TSG-RAN WG2#101, R2-1802141, 3rd Generation Partnership Project, Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 14, 2018, XP051399139, pp. 1-6, sections 1-3 section 5.
(Continued)

*Primary Examiner* — Jae Y Lee
*Assistant Examiner* — Haeshil Jessica Choi
(74) *Attorney, Agent, or Firm* — Paul M. McAdams; Holland & Hart LLP

(57) ABSTRACT

Methods, systems, and devices for wireless communication are described. A user equipment (UE) may receive first control information that enables the UE to skip transmission of a scheduled uplink message via an uplink skipping operation. The UE may receive second control information that requests the UE to switch an active BWP at the UE from a first BWP to a second BWP. The UE may receive third control information that schedules transmission of an uplink message at the UE during a time interval. Application of the uplink skipping operation to the uplink message may be based on the time interval being after the switch and whether the UE is scheduled to transmit a reference signal during the time interval. The UE may transmit, during the time interval and via the second BWP, a signal that is based on whether the UE applies the uplink skipping operation during the time interval.

30 Claims, 12 Drawing Sheets

(51) Int. Cl.
*H04W 72/0457* (2023.01)
*H04W 72/23* (2023.01)

(58) Field of Classification Search
USPC .......................................................... 370/329
See application file for complete search history.

(56) References Cited

OTHER PUBLICATIONS

International Search Report and Written Opinion—PCT/US2024/024376—ISA/EPO—Jul. 15, 2024 (2301885WO).

* cited by examiner

UPLINK TRANSMISSION HANDLING AFTER A BANDWIDTH PART SWITCH FOR DYNAMIC UPLINK SKIPPING

INTRODUCTION

The following relates to wireless communication, including uplink transmission handling after a bandwidth part (BWP) switch for dynamic uplink skipping.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE).

SUMMARY

The described techniques relate to improved methods, systems, devices, and apparatuses that support uplink transmission handling after a bandwidth part (BWP) switch for dynamic uplink skipping. For example, the described techniques provide a framework for determining whether to apply an uplink skipping operation after a BWP switch. In some examples, a network node may receive first control information via a first BWP. The first control information may enable the network node to skip transmission of a scheduled uplink message via the uplink skipping operation. The network node may also receive second control information via the first BWP. The second control information may request the network node to switch an active BWP at the network node from the first BWP to a second BWP. In some examples, the network node may receive third control information via the first BWP. The third control information may schedule transmission of an uplink message at the network node during a time interval. In some examples, application of the uplink skipping operation to the uplink message may be based on the time interval being after the switch. Additionally, application of the uplink skipping operation to the uplink message may be based on whether the network node is scheduled to transmit a reference signal during the time interval. The network node may transmit a signal during the time interval and via the second BWP. The signal that is transmitted during the time interval may be based on whether the network node applies the uplink skipping operation during the time interval.

A method of wireless communication performed by a network node is described. The method may include receiving, via a first BWP, first control information that enables the network node to skip transmission of a scheduled uplink message via an uplink skipping operation, receiving, via the first BWP, second control information that requests the network node to switch an active BWP at the network node from the first BWP to a second BWP, receiving, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval, and transmitting a signal during the time interval and via the second BWP, where the signal that is transmitted is based on whether the network node applies the uplink skipping operation during the time interval.

A network node for wireless communication is described. The network node may include a memory and at least one processor coupled to the memory. The at least one processor may be configured to receive, via a first BWP, first control information that enables the network node to skip transmission of a scheduled uplink message via an uplink skipping operation, receive, via the first BWP, second control information that requests the network node to switch an active BWP at the network node from the first BWP to a second BWP, receive, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval, and transmit a signal during the time interval and via the second BWP, where the signal that is transmitted is based on whether the network node applies the uplink skipping operation during the time interval.

An apparatus for wireless communication is described. The apparatus may include means for receiving, via a first BWP, first control information that enables the network node to skip transmission of a scheduled uplink message via an uplink skipping operation, means for receiving, via the first BWP, second control information that requests the network node to switch an active BWP at the network node from the first BWP to a second BWP, means for receiving, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval, and means for transmitting a signal during the time interval and via the second BWP, where the signal that is transmitted is based on whether the network node applies the uplink skipping operation during the time interval.

A non-transitory computer-readable medium having code for wireless communication stored thereon is described. The code, when executed by a network node, may cause the network node to receive, via a first BWP, first control information that enables the network node to skip transmission of a scheduled uplink message via an uplink skipping operation, receive, via the first BWP, second control information that requests the network node to switch an active BWP at the network node from the first BWP to a second BWP, receive, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval, and transmit a signal during the time interval and via the second BWP, where the signal that is transmitted is based on whether the network node applies the uplink skipping operation during the time interval.

In some examples of the method, network node, apparatus, and non-transitory computer-readable medium described herein, transmitting the signal may include operations, features, means, or instructions for refraining from application of the uplink skipping operation during the time interval and transmitting the uplink message during the time interval, where the signal may be the uplink message.

In some examples of the method, network node, apparatus, and non-transitory computer-readable medium described herein, the uplink skipping operation may be not applied during the time interval based on the reference signal not being scheduled for transmission during the time interval.

In some examples of the method, network node, apparatus, and non-transitory computer-readable medium described herein, transmitting the signal may include operations, features, means, or instructions for applying the uplink skipping operation during the time interval and transmitting the reference signal during the time interval, where the signal may be the reference signal.

In some examples of the method, network node, apparatus, and non-transitory computer-readable medium described herein, application of the uplink skipping operation during the time interval may be based on the network node being scheduled to transmit the reference signal during the time interval.

In some examples of the method, network node, apparatus, and non-transitory computer-readable medium described herein, the uplink skipping operation enables the network node to skip transmission of the scheduled uplink message based on a lack of uplink data at the network node during the time interval.

In some examples of the method, network node, apparatus, and non-transitory computer-readable medium described herein, transmission of the signal via the second BWP indicates that the network node successfully switched the active BWP at the network node from the first BWP to the second BWP.

Some examples of the method, network node, apparatus, and non-transitory computer-readable medium described herein may further include operations, features, means, or instructions for receiving, via the second BWP, fourth control information that schedules communication on the second BWP based on the active BWP at the network node being successfully switched from the first BWP to the second BWP.

Some examples of the method, network node, apparatus, and non-transitory computer-readable medium described herein may further include operations, features, means, or instructions for participating in the communication via the second BWP in response to the fourth control information.

In some examples of the method, network node, apparatus, and non-transitory computer-readable medium described herein, the uplink message includes a physical uplink shared channel (PUSCH) message.

In some examples of the method, network node, apparatus, and non-transitory computer-readable medium described herein, the reference signal includes a sounding reference signal (SRS).

DETAILED DESCRIPTION

Figure 1:
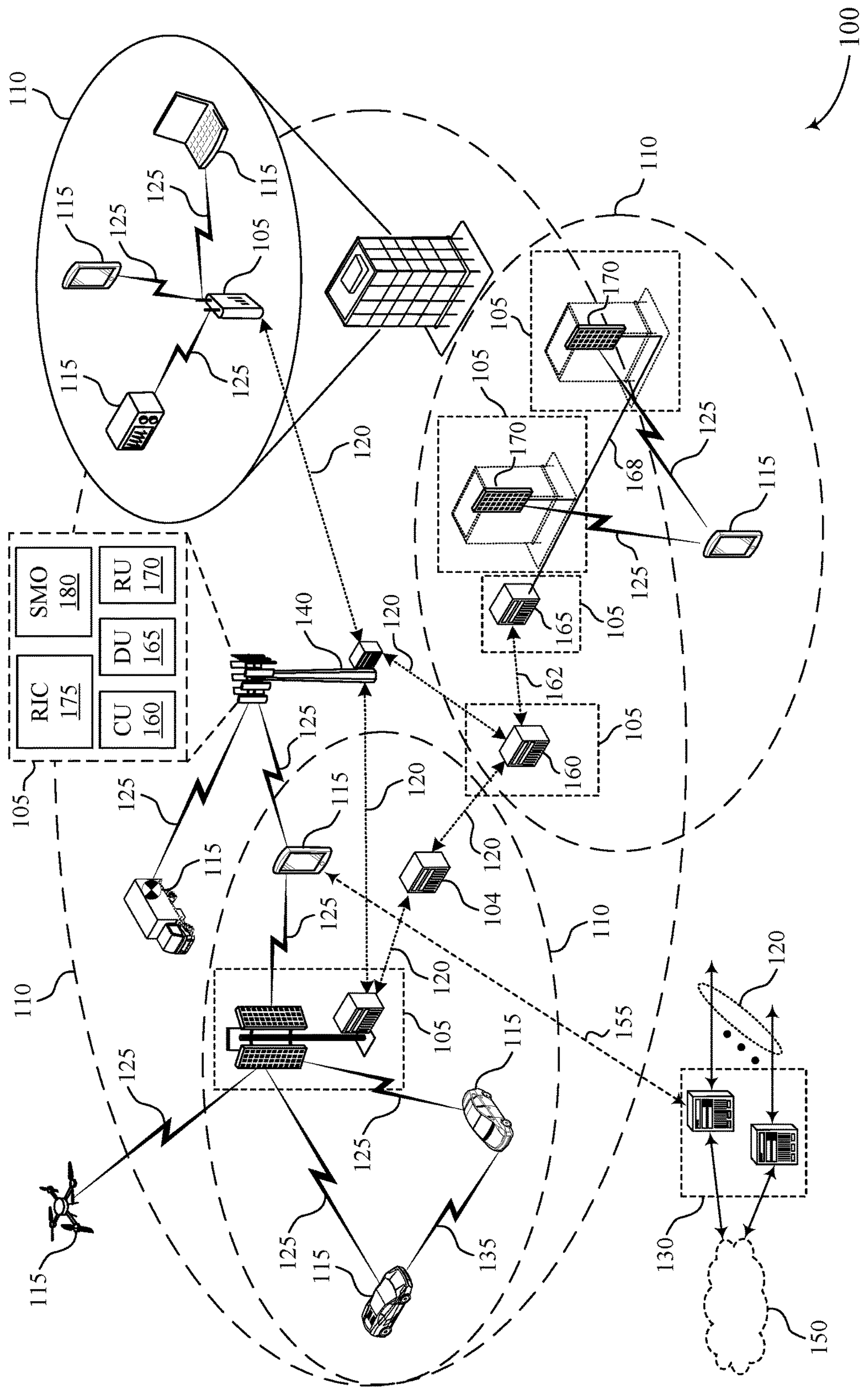
FIGS. 1 and 2 each show an example of a wireless communications system that supports uplink transmission handling after a bandwidth part (BWP) switch for dynamic uplink skipping in accordance with one or more aspects of the present disclosure.

Some wireless communications systems may support one or more features that enable power savings at one or more network nodes (e.g., a user equipment (UE), a network entity). For example, to conserve power, the UE may support an uplink skipping operation in which the UE may skip uplink transmissions during transmission occasions that the UE lacks uplink data. Additionally, the UE may support bandwidth part (BWP) switching. For example, the UE may establish a connection with the network entity via a cell with multiple BWP configurations. That is, the UE may (e.g., may attach on a cell that is served by the network entity and configured with multiple BWPs (e.g., a first BWP and a second BWP). In such examples, the network entity may transmit control signaling to the UE that request the UE to switch an active BWP at the UE (e.g., for the cell) from the first BWP (e.g., a current BWP) to the second BWP. In some examples, however, concurrently supporting the uplink skipping operation and BWP switching may lead to ambiguity in the behavior of the UE.

For example, the UE may receive an uplink grant scheduling transmission of an uplink message after the requested BWP switch. Additionally, the UE may lack data to transmit during the scheduled uplink transmission. As such, in accordance with the uplink skipping operation, the UE may skip the scheduled uplink transmission (e.g., may refrain from transmitting the uplink message) and may refrain from switching the active BWP from the first BWP to the second BWP in response to the request. In some examples, however, the network entity may be unaware that the UE refrained from switching the active BWP to the second BWP. In some other examples, the UE may determine to switch the active BWP to the second BWP in response to the request. In such examples, however, the UE may be unable to inform the network entity that the BWP switch was successful. For example, the UE may skip transmission of the uplink message via the second BWP (e.g., in accordance with the uplink skipping operation) and the network entity may therefore be unaware that the BWP switch was successful. In some examples, failing switch the active BWP in response to the request or failing to inform the network entity that a requested BWP switch is successful, or both, may lead to the network entity and the UE becoming desynchronized.

Various aspects of the present disclosure relate to techniques for uplink transmission handling after a BWP switch for dynamic uplink skipping and, more specifically, to a framework for determining whether to apply the uplink skipping operation after a BWP switch. For example, the UE may receive first control information via the first BWP that may enable the UE to skip transmission of a scheduled uplink message via the uplink skipping operation. Additionally, the UE may receive second control information via the first BWP that may request the UE to switch the active BWP at the UE from the first BWP to the second BWP. In some examples, the UE may receive third information via the first BWP that may schedule transmission of an uplink message at the UE during a time interval. In such examples, the UE may determine whether to apply the uplink skipping operation during the time interval (e.g., to the scheduled uplink message) based on whether the UE is scheduled to transmit a reference signal during the time interval. That is, application of the uplink skipping operation to the uplink message may be based on the time interval being after the BWP switch and whether the UE is scheduled to transmit the reference signal during the time interval.

For example, in response to receiving the request to switch the active BWP to the second BWP, the UE may transmit a signal during the time interval via the second BWP. In such an example, the signal that is transmitted during the time interval may be based on whether the UE applies the uplink skipping operation to the uplink message. In some examples, the UE may be scheduled to transmit the reference signal during the time interval. In such examples, the UE may apply the uplink skipping operation to the uplink message and the signal that is transmitted during the time interval may be the reference signal. In some other examples, the UE may not be scheduled to transmit the reference signal during the time interval. In such examples, the UE may refrain from applying the uplink skipping operation to the uplink message and the signal that is transmitted during the time interval may be the uplink message.

Aspects of the subject matter described herein may be implemented to realize one or more of the following potential advantages. For example, the techniques employed by the described communication devices may provide benefits and enhancements to the operation of the communication devices, including reduced latency associated with BWP switching. The operations performed by the described communication devices to reduce latency for BWP switching may include configuring a UE to apply an uplink skipping operation to an uplink message during a time interval based on whether the UE is scheduled to transmit a reference signal during the time interval. In some examples, operations performed by the described communication devices may also support increased reliability of communications within a wireless communications system, among other benefits.

Aspects of the disclosure are initially described in the context of wireless communications systems. Aspects of the disclosure are also described in the context of a BWP switching scheme and process flows. Aspects of the disclosure are further illustrated by and described with reference to apparatus diagrams, system diagrams, and flowcharts that relate to uplink transmission handling after a BWP switch for dynamic uplink skipping.

FIG. 1 shows an example of a wireless communications system 100 that supports uplink transmission handling after a BWP switch for dynamic uplink skipping in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support uplink transmission handling after a BWP switch for dynamic uplink skipping as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of the wireless communications system 100, a UE 115 may support an uplink skipping operation. Additionally, the UE 115 may receive a request from a network entity 105 to switch an active BWP at the UE 115 from a first BWP to a second BWP. In some examples, the UE 115 may receive an uplink grant scheduling transmission of an uplink message after the requested BWP switch. The UE 115 may lack data to transmit during the scheduled uplink transmission and, in accordance with the uplink skipping operation, the UE 115 may skip the scheduled uplink transmission (e.g., may refrain from transmitting the uplink message). In some examples, based on the UE 115 skipping the scheduled uplink transmission, the network entity 105 may be unaware of whether the UE 115 successfully switched the active BWP to the second BWP, which may lead to the network entity 105 and the UE 115 becoming desynchronized.

In some other examples, the UE 115 may support a framework for determining whether to apply the uplink skipping operation after a BWP switch. For example, the UE 115 may receive first control information via the first BWP that may enable the uplink skipping operation at the UE 115. Additionally, the UE 115 may receive second control information via the first BWP that may request the UE 115 to switch the active BWP at the UE 115 from the first BWP to the second BWP. In some examples, the UE 115 may receive third information via the first BWP that may schedule transmission of an uplink message at the UE 115 during a time interval. In such examples, the UE 115 may determine whether to apply the uplink skipping operation during the time interval (e.g., to the scheduled uplink message) based on whether the UE 115 is scheduled to transmit a reference signal during the time interval. That is, application of the uplink skipping operation to the uplink message may be based on the time interval being after the BWP switch and whether the UE 115 is scheduled to transmit the reference signal during the time interval.

In some examples, the UE 115 may be scheduled to transmit the reference signal during the time interval. In such examples, the UE 115 may apply the uplink skipping operation to the uplink message and may transmit the reference signal during the time interval. In some other examples, the UE 115 may not be scheduled to transmit the reference signal during the time interval. In such examples, the UE 115 may refrain from applying the uplink skipping operation to the uplink message and may transmit the uplink message during the time interval. In some examples, determining whether to apply an uplink skipping operation to an uplink message during a time interval based on whether the UE 115 is scheduled to transmit a reference signal during the time interval may lead to increased reliability of communications within the wireless communications system 100, among other benefits.

Figure 2:
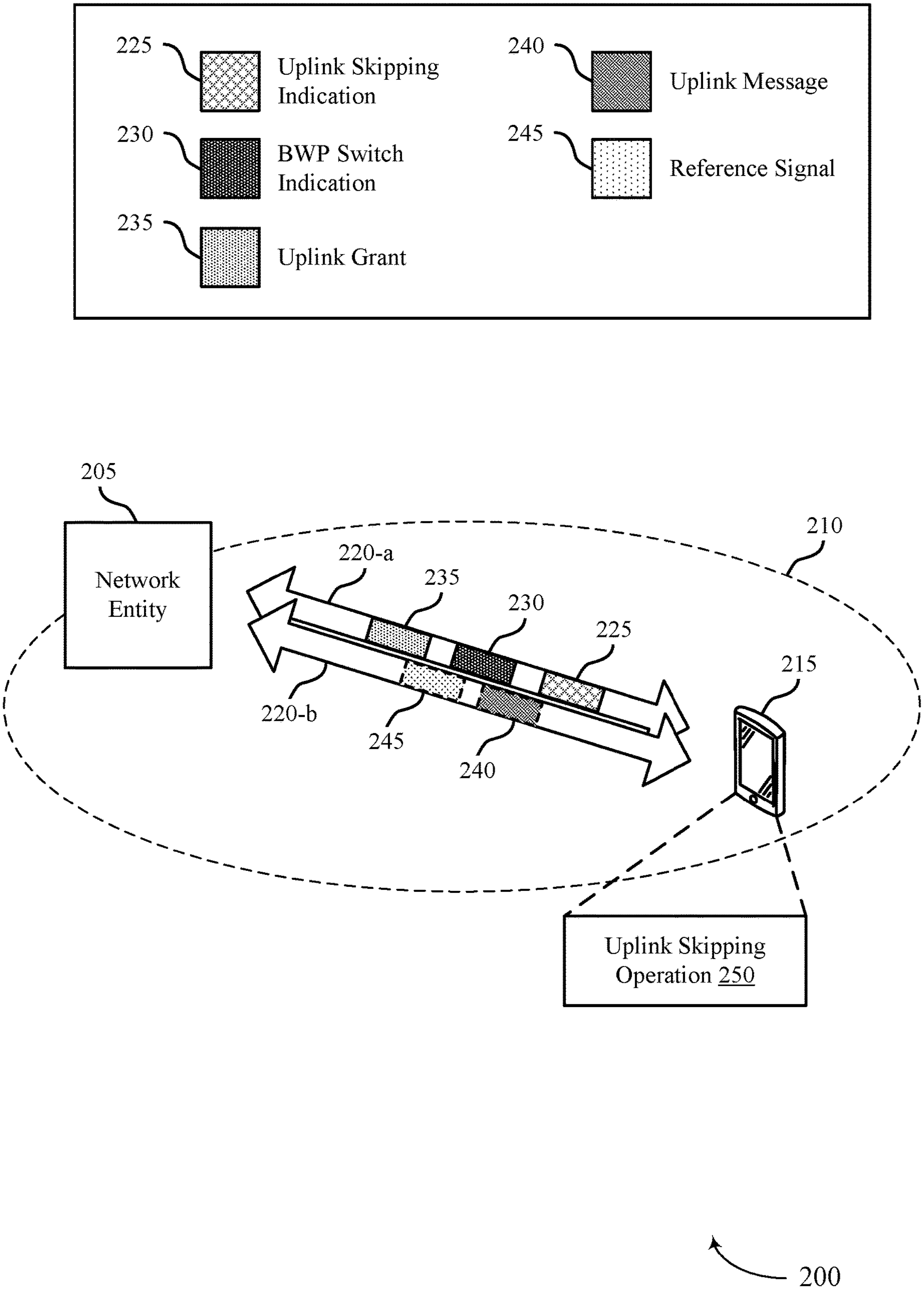

FIG. 2 shows an example of a wireless communications system 200 that supports uplink transmission handling after a BWP switch for dynamic uplink skipping in accordance with one or more aspects of the present disclosure. In some examples, the wireless communications system 200 may implement or be implemented at one or more aspects of the wireless communications system 100. For example, the wireless communications system 200 may include a UE 215, which may be an example of a UE 115 (or another network node) illustrated by and described with reference to FIG. 1. The wireless communications system 200 may also include a network entity 205, which may be an example of one or more of the network entities 105 (e.g., a CU, a DU, an RU, a base station, an IAB node, or one or more other network nodes) illustrated by and described with reference to FIG. 1. The UE 215 and the network entity 205 may communicate within a coverage area 210, which may be an example of a coverage area 110 illustrated by and described with reference to FIG. 1. For example, the UE 215 and the network entity 205 may communicate within the coverage area 210 via a communication link 220-*a* and a communication link 220-*b*, which may be examples of a communication link 125 (e.g., a Uu link) illustrated by and described with reference to FIG. 1. In the example of FIG. 2, the communication link 220-*a* may be associated with a first BWP and the communication link 220-*b* may be associated with a second BWP. For example, the UE 215 may attach on a cell (e.g., a cell providing the coverage area 210) with more than one BWP configuration (e.g., a BWP configuration for the first BWP and a BWP configuration for the second BWP).

The wireless communications system 200 may support one or more features that enable power savings at the UE 215 or the network entity 205, or both. For example, the wireless communications system 200 may support an uplink skipping feature (e.g., an uplink skipping operation 250) that enable (e.g., allow) the UE 215 to skip one or more uplink transmissions (e.g., physical uplink shared channel (PUSCH) transmissions, physical uplink control channel (PUCCH) transmissions, sounding reference signal (SRS) transmissions) for occasion during which the UE 215 may lack uplink data (e.g., to transmit to the network entity 205). In other words, the UE 215 (e.g., and the network entity 205) may support the uplink skipping operation 250 in which the UE 215 may avoid uplink transmissions (e.g., PUSCH transmissions) for occasions in which traffic (e.g., data traffic, real traffic, higher layer traffic, application traffic) may be unavailable (e.g., irrespective of the network entity 205 providing one or more grants for the uplink transmissions during the occasions). In some examples, the uplink skipping operation 250 may enable the UE 215 to conserve power (e.g., may provide more time for the UE 215 to conserve power). For example, the UE 215 may receive an uplink grant 235 via a DCI (e.g., a DCI grant) that schedules transmission of an uplink message 240, but the UE 215 may determine that the UE 215 lacks data to transmit (e.g., during the scheduled transmission). In such an example, the UE 215 may use the uplink skipping operation 250 to drop the scheduled uplink transmission (e.g., may discard the uplink grant 235). For example, after the UE 215 decodes the DCI with the uplink grant 235, the UE 215 may discard the uplink grant 235 (e.g., based on determining that the UE 215 lacks data to transmit) and enter (or remain in) a sleep state, which may enable the UE 215 to conserve power.

In some examples, the network entity 205 may configure the UE 215 with the uplink skipping operation 250 (e.g., may enable an uplink skipping operation 250 at the UE 215). For example, the network entity 205 may transmit control signaling (e.g., a MAC control element (MAC-CE), RRC signaling) to the UE 215 that includes an uplink skipping indication 225. The uplink skipping indication 225 may enable the UE 215 to skip transmission of a scheduled uplink message (e.g., the uplink message 240) via the uplink skipping operation 250. For example, the uplink skipping indication 225 may be an example of a field or an information element (IE) that indicates whether the UE 215 may support skipping of uplink transmissions if no data is available for transmission. In some examples, the uplink skipping indication 225 (e.g., an IE) may be set to true and indicate that the UE 215 supports (e.g., enable the UE 215 to support) skipping of uplink transmissions if no data is available for transmission. The names of IEs and fields may change based on implementation of one or multiple devices (e.g., the UE 215, the network entity 205, or both). Some examples of an IE that indicates whether the UE 215 may support skipping of uplink transmissions if no data is available for transmission may include an skipUplinkTxDynamic IE, an enhancedSkipUplinkTxDynamic-r16 IE, or an enhancedSkipUplinkTxConfigured-r16 IE, among other examples of IEs.

In some examples, the uplink skipping indication 225 may be set to true and enable the UE 215 to support skipping of uplink transmissions for uplink grants indicated on a physical downlink control channel (PDCCH). For example, the uplink skipping indication 225 may enable the UE 215 to support skipping of uplink transmissions for uplink grants indicated on PDCCH if no data is available for transmission. In some other examples, the uplink skipping indication 225 may be set to true and enable the UE 215 to support skipping of uplink transmissions for uplink grants addressed to the UE 215 (e.g., addressed to a cell radio network temporary identifier (C-RNTI) or another type of identifier associated with the UE 215). For example, the uplink skipping indication 225 may enable the UE 215 to support skipping of uplink transmissions for uplink grants addressed to the UE 215 if no data is available for transmission (e.g., and no uplink control information (UCI) is multiplexed on the corresponding PUSCH of the uplink grant). In some examples, the uplink skipping indication 225 may be set to true and enable the UE 215 to supports skipping uplink transmissions for configured uplink grants. For example, the uplink skipping indication 225 may enable the UE 215 to supports skipping uplink transmissions for configured uplink grants if no data is available for transmission (e.g., and no UCI is multiplexed on the corresponding PUSCH of the uplink grants).

Additionally, the network entity 205 may configure the UE 215 to switch BWPs. For example, the network entity 205 may transmit control signaling (e.g., a DCI, such as a DCI_0_1) to the UE 215 that includes a BWP switch indication 230. The BWP switch indication may request the UE 215 to switch an active BWP at the UE 215 from a first BWP (e.g., a current BWP) to a second BWP. In some examples, reception of the BWP switch indication 230 and the uplink skipping indication 225 at the UE 215 may lead to ambiguous behavior at the UE 215. That is, concurrently supporting the uplink skipping operation 250 and a BWP switch may lead to ambiguity in the behavior of the UE 215. For example, receiving a request to switch the active BWP at the UE 215 (e.g., via the BWP switch indication 230) while concurrently supporting the uplink skipping operation 250 (e.g., based on the uplink skipping indication 225) may lead to ambiguity in uplink transmission handling at the UE 215 if the UE 215 lacks data to transmit after the requested switch. That is, there may be ambiguity in UE handling, for example, if the BWP switch indication 230 is received (e.g., on a DCI_0_1) with no active data and the uplink skipping operation 250 is enabled (e.g., via the uplink skipping indication 225).

In some examples, the UE 215 may be configured to support the uplink skipping operation 250 and may receive the uplink grant 235 scheduling an uplink transmission after the requested BWP switch. Additionally, the UE 215 may lack data to transmit during the scheduled uplink transmission and, as such, may skip the scheduled uplink transmission (e.g., using the enabled uplink skipping operation 250). In such examples, however, the UE 215 may fail to switch the active BWP from the first BWP to the second BWP in response to the BWP switch indication 230 (e.g., based on the scheduled uplink transmission being skipped). For example, if the uplink transmission is scheduled to occur after the requested BWP switch and the UE 215 lacks uplink data for the scheduled uplink transmission, the UE 215 may remain on the first BWP (e.g., the current BWP) without switching. That is, the UE 215 may receive (and decode) the DCI (e.g., a DCI_0_1) with the BWP switch indication 230 on the first BWP and the network entity 205 may expect the UE 215 to transmit on the second BWP (e.g., in accordance with the uplink grant 235 and BWP switch indication 230). However, the UE 215 may skip the scheduled uplink transmission (e.g., may discard the uplink grant 235) due to the uplink skipping operation 250 (e.g., and a lack of uplink data to transmit) and may remain on the first BWP (e.g., may become stuck on the first BWP). In other words, in accordance with some UE behavior and due to the uplink skipping operation 250 being enabled, the UE 215 may refrain from switching to the second BWP, which may lead to the UE 215 and the network entity 205 becoming desynchronized (e.g., may result in OUT-OF-SYNC between the UE 215 and the network entity 205). That is, due to the uplink skipping operation 250, the UE 215 may not switch the active BWP in response to the BWP switch indication 230 (e.g., via the DCI_0_1), which may result in an out-of-sync state between the network entity 205 and the UE 215.

For example, the UE 215 may be receive control information on the first BWP that schedules the UE 215 to transmit a reference signal 245 (e.g., periodically or aperiodically) to the network entity 205. In some examples, the network entity 205 may schedule the UE 215 to transmit the reference signal 245 (e.g., an SRS) for UE power control (e.g., on the second BWP) or to inform the network entity 205 about the BWP switch, or both. After the network entity 205 transmits the BWP switch indication 230 to the UE 215, the network entity 205 may switch to the second BWP and may expect the UE 215 to transmit the reference signal 245 on the second BWP. In some examples, however, transmission of the reference signal 245 may be scheduled during a same time interval (e.g., a same symbol, a same slot) as the uplink message 240 (e.g., an uplink transmission for which the UE 215 may lack uplink data). In such examples, based on the uplink skipping operation 250 being enabled, the UE 215 may refrain from switching to the second BWP and may transmit the reference signal 245 on the first BWP. That is, the UE 215 may transmit the reference signal 245 on the first BWP, while the network entity 205 may be monitoring the second BWP and may therefore fail to detect the reference signal 245. In other words, due to the uplink skipping operation 250 being enabled, the UE 215 may determine to ignore the uplink transmission (e.g., transmission of the uplink message 240). As such, the UE 215 may become stuck on the first BWP, while the network entity 205 may be expecting the UE 215 to transmit on (e.g., and may therefore be monitoring) the second BWP. In other words, the network entity 205 may be unaware of the UE 215 being stuck on the first BWP.

In some other examples, the UE 215 may determine to switch to the second BWP in response to the BWP switch indication 230 (e.g., irrespective of whether the UE 215 applies the uplink skipping operation 250 to the uplink message 240). In such examples, however, the UE 215 may be unable to inform the network entity 205 that the BWP switch was successful (e.g., due to the UE 215 skipping transmission of the uplink message 240). That is, the UE 215 may be unable to inform the network entity 205 that the BWP switch was successful before the network entity 205 may schedule subsequent transmissions for the UE 215. For example, the network entity 205 may schedule the UE 215 to transmit the reference signal 245 during a same time interval in which the UE 215 may be scheduled to transmit the uplink message 240 for which the UE 215 may lack uplink data. In such examples, the UE 215 may switch to the second BWP, but may skip transmission of the uplink message 240 and the reference signal 245 based on the uplink skipping operation 250 being enabled. As such, the network entity 205 may be unaware of the BWP switch at the UE 215. In other words, the UE 215 may use the uplink skipping operation 250 to conserve power by skipping the scheduled uplink transmission and, as such, may be refrain from using the second BWP for an uplink transmission to inform the network entity 205 about the BWP switch (e.g., irrespective of whether the BWP switch is successful). In some examples, failing to inform the network entity 205 that a requested BWP switch is successful, may lead to the network entity 205 and the UE 215 becoming desynchronized.

In some examples, one or more techniques for uplink transmission handling after a BWP switch for dynamic uplink skipping, as described herein, may enable the UE 215 to inform the network entity 205 that a requested BWP switch is successful. For example, such techniques may provide a framework for determining whether to apply the uplink skipping operation 250 after a BWP switch. As illustrated in the example of FIG. 2, the UE 215 may receive the uplink skipping indication 225 via the first BWP (e.g., via the communication link 220-*a*, which may be associated with wireless communications via the first BWP). The uplink skipping indication 225 may enable the UE 215 to skip transmission of a scheduled uplink message (e.g., the uplink message 240) via the uplink skipping operation 250. Additionally, the UE 215 may receive the BWP switch indication 230 via the first BWP. The BWP switch indication 230 may request the UE 215 to switch an active BWP at the UE 215 from the first BWP to the second BWP.

In some examples, the UE 215 may receive the uplink grant 235 via the first BWP. The uplink grant 235 may schedule transmission of the uplink message 240 at the UE 215 during a time interval. The UE 215 may determine whether to apply the uplink skipping operation 250 during the time interval (e.g., after the requested BWP switch) based on whether the UE 215 is scheduled to transmit the reference signal 245 (e.g., an SRS) during the time interval. That is, application of the uplink skipping operation 250 to the uplink message 240 may be based on the time interval being after the BWP switch and whether the UE 215 is scheduled to transmit the reference signal 245 during the time interval. In other words, the UE 215 may determine whether to skip transmission of the uplink message 240 using the uplink skipping operation 250 based on whether the UE 215 is scheduled to transmit the reference signal 245 during a same time interval as the uplink message 240.

For example, the UE 215 may transmit a signal during the time interval via the second BWP. In such an example, the signal that is transmitted during the time interval may be based on whether the UE 215 applies the uplink skipping operation 250 during the time interval. In other words, in response to receiving the BWP switch indication 230 (e.g., via control information, such as on a DCI_0_1), and based on the uplink skipping operation 250 being enabled (e.g., via the uplink skipping indication 225) the UE 215 may determine whether the UE 215 is scheduled to transmit the reference signal 245 during the time interval. In some examples, the UE 215 may be scheduled to transmit the reference signal 245 during the time interval. In such examples, during the time interval, the UE 215 may apply the uplink skipping operation 250 (e.g., may skip transmission of the uplink message 240) and may transmit the reference signal 245 via the second BWP. In some other examples, the UE 215 may not be scheduled to transmit the reference signal 245 during the time interval. In such examples, during the time interval, the UE 215 may refrain from applying the uplink skipping operation 250 and may transmit the uplink message 240 via the second BWP. In some examples, determining whether to apply the uplink skipping operation 250 during a time interval based on whether a reference signal is scheduled during the time interval (e.g., based on the presence or absence of a reference signal during the time interval) may lead to increased power savings at the UE 215 and increased reliability of wireless communications between the UE 215 and the network entity 205, among other benefits.

Figure 3:
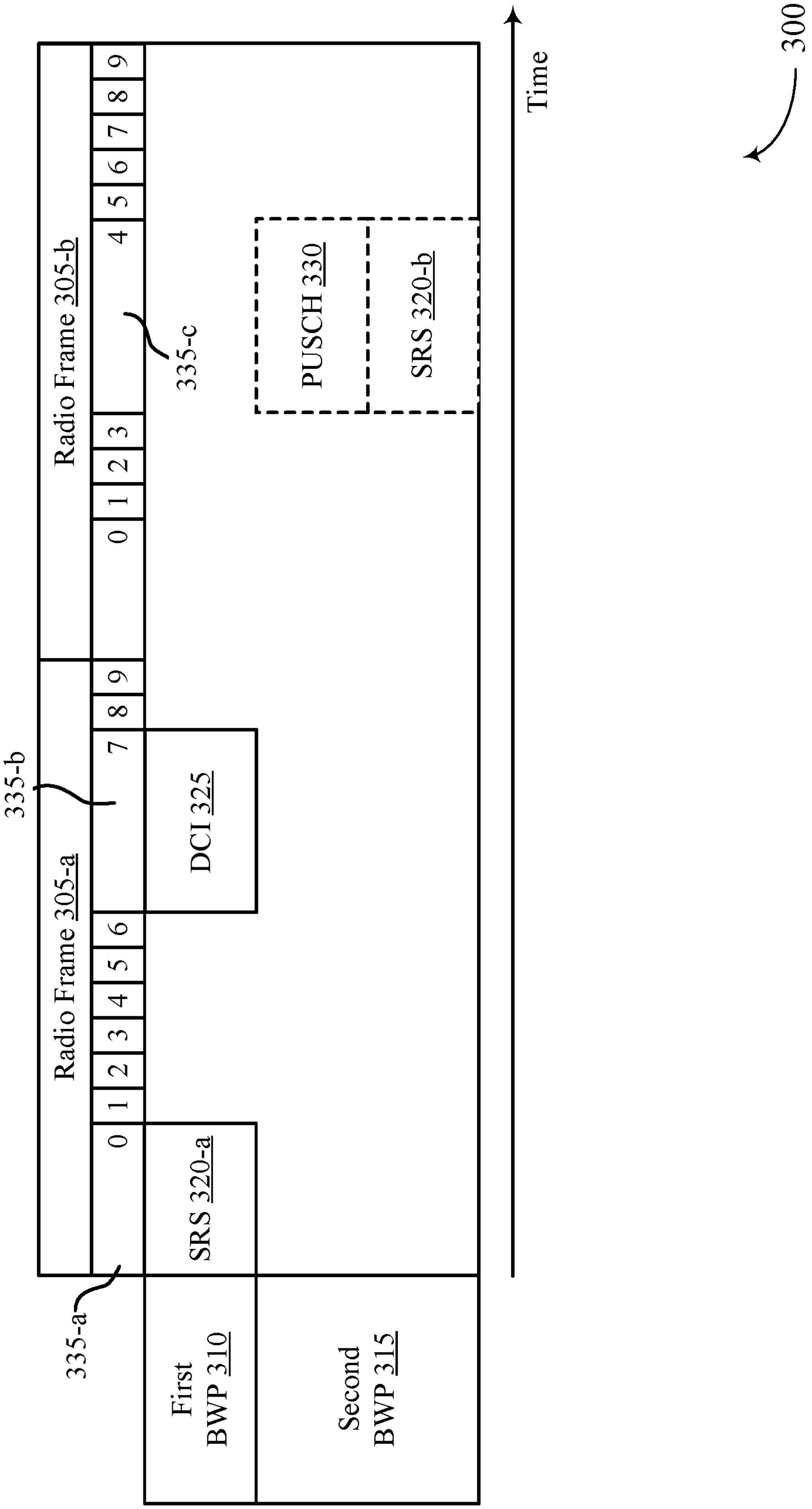
FIG. 3 shows an example of a BWP switching scheme that supports uplink transmission handling after a BWP switch for dynamic uplink skipping in accordance with one or more aspects of the present disclosure.

FIG. 3 shows an example of a BWP switching scheme 300 that supports uplink transmission handling after a BWP switch for dynamic uplink skipping in accordance with one or more aspects of the present disclosure. In some examples, the BWP switching scheme 300 may implement or be implemented at one or more aspects of the wireless communications system 100 and the wireless communications system 200. For example, the BWP switching scheme 300 may be implemented at a UE or a network entity, or both, which may be examples of the corresponding devices illustrated by and described with reference to FIGS. 1 and 2. In the example of FIG. 3, the UE and the network entity may support wireless communications via multiple BWPs. For example, the UE may attach on a cell served by the network entity, and the cell may have more than one BWP configuration (e.g., a BWP configuration for a first BWP 310 and a BWP configuration for the second BWP 315).

In the example of FIG. 3, the UE may support an uplink skipping operation in which the UE may skip a scheduled uplink transmission if the UE lacks data for the transmission. For example, the network entity may transmit control signaling (e.g., a MAC-CE, RRC signaling, a DCI) to the UE that enables the UE to skip transmission of a scheduled uplink message via the uplink skipping operation. In some examples, the UE may support a framework for determining whether to apply the uplink skipping operation after a BWP switch. For example, the UE may be configured to determine whether to apply the uplink skipping operation during a time interval after the BWP switch based on whether the UE is scheduled to transmit a reference signal during the time interval.

As illustrated in the example of FIG. 3, the UE may be configured to transmit one or more SRS (e.g., an SRS 320-*a*, an SRS 320-*b*) to the network entity. For example, the network entity may schedule periodic SRS transmissions at the UE (e.g., via RRC signaling) or aperiodic SRS transmission at the UE (e.g., via DCI). That is, the SRSs 320 may correspond to periodic or aperiodic SRSs. In the example of FIG. 3, the network entity may schedule the UE to transmit the SRS 320-*a* during a slot 335-*a* (e.g., a slot with index 0) of a radio frame 305-*a*. During the slot 335-*a*, an active BWP at the UE may be set to (e.g., configured for communications via) the first BWP 310. Accordingly, the network entity may expect the UE to transmit the SRS 320-*a* during the slot 335-*a* via the first BWP 310 (e.g., and may therefore monitor the first BWP 310 for the SRS 320-*a*). As illustrated in the example of FIG. 3, the UE may transmit the SRS 320-*a* to the network entity during the slot 335-*a* via the first BWP 310.

In some examples, the network entity may schedule transmission of an uplink message via the PUSCH during a slot 335-*c* of a radio frame 305-*b*. For example, the network entity may schedule transmission of a PUSCH during the slot 335-*c*. In some examples, the network entity may transmit an uplink grant (e.g., via a DCI, such as a DCI_0_1) to the UE via the first BWP 310 that schedules transmission of the PUSCH 330 during the slot 335-*c*.

The UE may receive (and decode) the DCI 325 on the first BWP 310 during a slot 335-*b* of the radio frame 305-*a*. The DCI 325 may include a BWP switch indication that requests the UE to switch the active BWP at the UE from the first BWP 310 to the second BWP 315. In other words, during the slot 335-*b*, the DCI 325 (e.g., a same DCI_0_1 that schedules the PUSCH 330 or another DCI_0_1) may be decoded on the first BWP 310 with the BWP switch indication that requests the UE to switch the active BWP at the UE from the first BWP 310 to the second BWP 315. In response to receiving the DCI 325, and based on the PUSCH 330 being scheduled after reception of the DCI 325 (e.g., after the requested BWP switch), the UE may determine whether to apply the uplink skipping operation to the PUSCH 330. For example, the UE may identify a lack of uplink data during the slot 335-*c* and, as such, may determine that the slot 335-*c* is eligible for uplink skipping (e.g., via the uplink skipping operation based on the lack of uplink data). In some examples, the UE may determine whether to apply the uplink skipping operation based on whether the UE is scheduled to transmit the SRS 320-*b* during the slot 335-*c*. In other words, upon receiving a BWP switch request via the DCI 325 (e.g., on DCI_0_1) and based on the uplink skipping operation being enabled, the UE may check an uplink slot configuration (e.g., an uplink configuration for the slot 335-*c*) of the second BWP 315 to determine whether transmission of the SRS 320-*b* may be scheduled during the slot 335-*c* (e.g., on a same slot as the PUSCH 330). In other words, the network entity may transmit the DCI 325 with the BWP switch indication and the UE may determine whether the slot 335-*c* (e.g., the PUSCH transmission slot) on the second BWP 315 also has transmission of the SRS 320-*b* configured.

The network entity may expect the UE to switch the active BWP at the UE from the first BWP to the second BWP in response to the DCI 325 (e.g., based on the BWP switch indication). For example, based on the BWP switch indication, the network entity may expect the UE to process DCIs received at the UE on the second BWP 315. Additionally, based on the BWP switch indication, the network entity may expect the UE to transmit scheduled uplink messages (e.g., scheduled PUCCHs, scheduled PUSCHs, scheduled SRSs) on the second BWP 315.

In some examples, the UE may determine that the SRS 320-*b* is not scheduled during the slot 335-*c*. In such examples, the UE may refrain from applying the uplink skipping operation during the slot 335-*c*, such that the UE may transmit the PUSCH 330 during the slot 335-*c*. That is, the UE may identify an absence of an SRS transmission during the slot 335-*c* and, as such, may determine to transmit the PUSCH 330 during the slot 335-*c*. In other words, the UE may determine that the SRS 320-*b* is absent (e.g., from the uplink configuration for the slot 335-*c*), may continue to process the PUSCH 330 on the slot 335-*c* (e.g., the intended slot) on the second BWP 315, and may transmit the PUSCH 330 (e.g., irrespective of the slot 335-*c* being eligible for uplink skipping via the uplink skipping operation). In some examples, by refraining from applying the uplink skipping operation during the slot 335-*c*, the UE may maintain synchronization (e.g., avoid becoming out-of-sync) with the network entity.

In some other examples, the UE may determine that the SRS 320-*b* is scheduled during the slot 335-*c*. In such examples, the UE may apply the uplink skipping operation to the PUSCH 330 and may transmit the SRS 320-*b* during the slot 335-*c*. That is, the UE may identify a presence of an SRS transmission during the slot 335-*c* and, as such, may transmit the SRS 320-*b* during the slot 335-*c*. In other words, the UE may determine that the SRS 320-*b* is present (e.g., in the uplink configuration for the slot 335-*c*), may suppress the PUSCH 330 (e.g., via the uplink skipping operation), and may transmit the SRS 320-*b* on the second BWP 315 during the slot 335-*c* (e.g., a slot eligible for uplink skipping via the uplink skipping) to inform the network entity that the requested BWP switch was successful. In other words, the UE may make use of the SRS 320-*b* on the second BWP 315 to inform the network entity about the BWP switch (e.g., without transmitting the PUSCH 330 on the second BWP 315 due to the lack of uplink data). In some examples, the uplink grant may be a MAC padding grant and, as such, the UE may use (e.g., follow) the uplink skipping operation and determine not to transmit the PUSCH 330. In such examples, the network entity may determine that no PUSCH is detected. Additionally, the network entity may determine that the SRS 320-*b* is detected on the second BWP 315, which may confirm at the network entity that the UE successfully switched the active BWP from the first BWP 310 to the second BWP 315. In some examples, transmitting the SRS 320-*b* during the slot 335-*c* may enable the UE to inform the network entity about a BWP switch, which may reduce latency and increase resource utilization, among other benefits.

Figure 4:
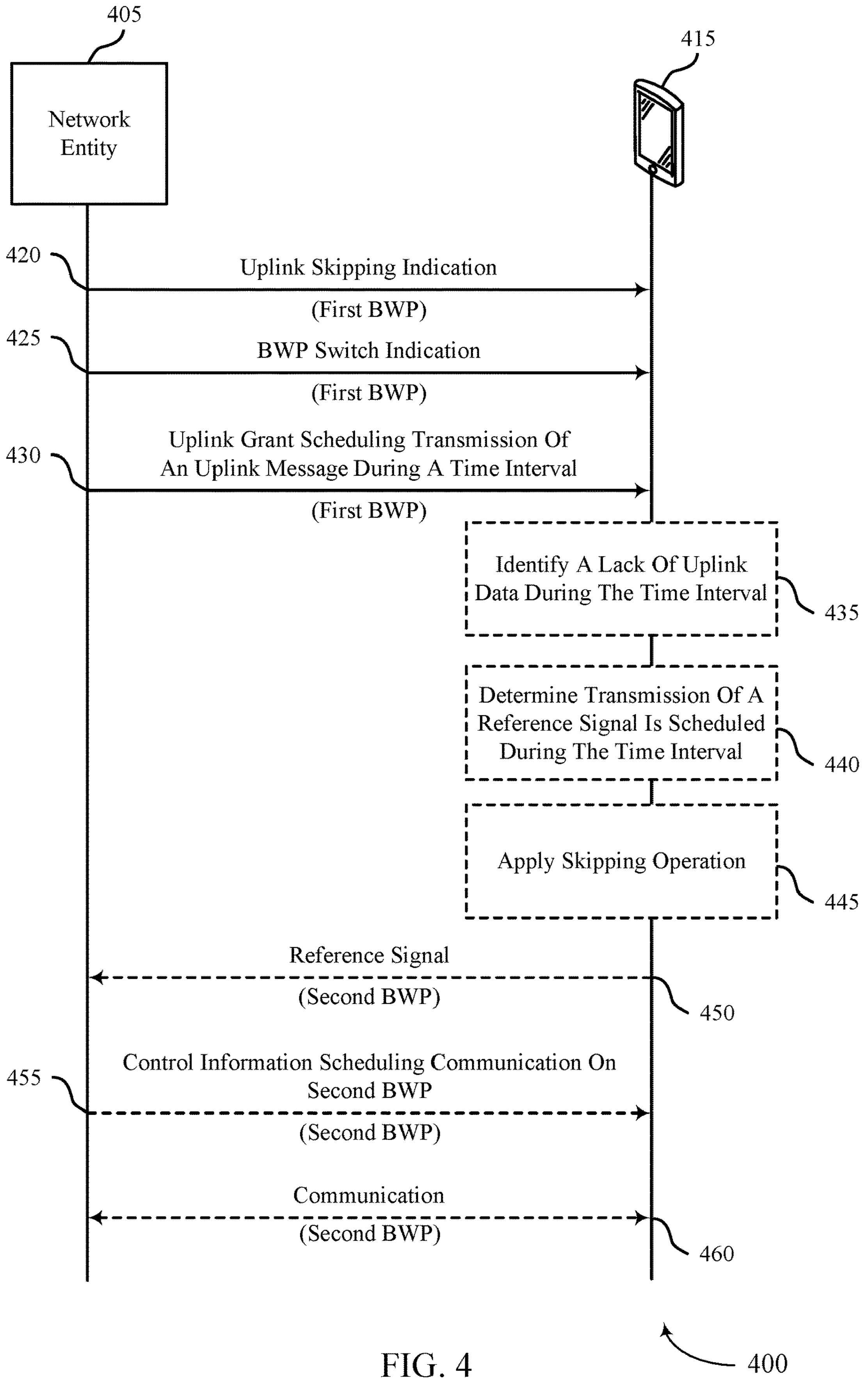
FIGS. 4 and 5 each show an example of a process flow that supports uplink transmission handling after a BWP switch for dynamic uplink skipping in accordance with one or more aspects of the present disclosure.

FIG. 4 shows an example of a process flow 400 that supports uplink transmission handling after a BWP switch for dynamic uplink skipping in accordance with one or more aspects of the present disclosure. In some examples, the process flow 400 may implement one or more aspects of wireless communications system 100, the wireless communications system 200, and the BWP switching scheme 300. For example, the process flow 400 may include example operations associated with a network entity 405 and a UE 415, which may be examples of the corresponding devices illustrated by and described with reference to FIGS. 1 through 3. The operations performed by the network entity 405 and the UE 415 may support improvements to communications between the UE 415 and the network entity 405, among other benefits. In the following description of the process flow 400, the operations between the UE 415 and the network entity 405 may occur in a different order than the example order shown. Additionally, or alternatively, the operations performed by the UE 415 and the network entity 405 may be performed in different orders or at different times. Some operations may also be omitted and some operations may be combined. The UE 415 and the network entity 405 may support a framework for determining whether to apply an uplink skipping operation after a BWP switch.

At 420, the UE 415 may receive an uplink skipping indication via a first BWP. The uplink skipping indication may be an example of an uplink skipping indication illustrated by and described with reference to FIGS. 2 and 3. For example, the uplink skipping indication may include control information that enables the UE 415 to skip transmission of a scheduled uplink message via an uplink skipping operation.

At 425, the UE 415 may receive a BWP switch indication via the first BWP. The BWP switch indication may be an example of a BWP switch indication illustrated by and described with reference to FIGS. 2 and 3. For example, the BWP switch indication may include control information that requests the UE 415 to switch an active BWP at the UE 415 from the first BWP to a second BWP. In some examples, the BWP switch indication may be transmitted via a DCI. For example, the network entity 405 may transmit a DCI (e.g., in accordance with a DCI_0_1 format) that includes the BWP switch indication. For example, the DCI (e.g., the BWP switch indication) may indicate that a BWP ID of the active BWP changed from a value of 1 to a value of 2.

At 430, the UE 415 may receive an uplink grant via the first BWP. The uplink grant may be an example of an uplink grant illustrate by and described with reference to FIGS. 2 and 3. For example, the uplink grant (e.g., control information, such as a DCI) may schedule transmission of an uplink message at the UE 415 during a time interval. In some examples, the uplink grant may schedule a PUSCH transmission at the UE 415 during a slot (e.g., during a PUSCH slot). For example, the control information may be a DCI that includes an uplink grant scheduling transmission of the uplink message via the PUSCH during the time interval (e.g., a PUSCH slot). In some examples, the uplink grant may be transmitted via a DCI with the BWP switch indication. For example, the network entity 405 may transmit a DCI (e.g., in accordance with a DCI_0_1 format) that includes the BWP switch indication and the uplink grant. In some examples, the DCI (e.g., the uplink grant) may also include an indication of a parameter (K2), which may indicate a timing offset (e.g., a quantity of symbols, a quantity of slots) for transmission of the uplink message. For example, the parameter (K2) may indicate a quantity of time intervals (e.g., a quantity of symbols, a quantity of slots) after reception of the DCI (e.g., via the PDCCH) that the UE 415 may transmit the uplink message (e.g., via the PUSCH). As an illustrative example, the UE 415 may receive the DCI in a slot with index 1 and the DCI may include the BWP switch indication, the uplink grant scheduling transmission of the uplink message, and the parameter (K2) with a value of 7 (e.g., the network entity may transmit BWP Switch 421/7-DCI_0_1 K2=7). In such an example, the UE 415 may process the DCI and determine that transmission of the uplink message is scheduled in a slot with index 8.

In some examples, application of the uplink skipping operation to the uplink message may be based on the time interval being after the switch. Additionally, application of the uplink skipping operation may be based on whether the UE 415 is scheduled to transmit a reference signal during the time interval. For example, application of the uplink skipping operation may be based on whether the UE 415 is scheduled to transmit the reference signal (e.g., an SRS) during the PUSCH slot.

In some examples, at 435, the UE 415 may identify a lack of uplink data during the time interval. In such examples, the UE 415 may determine that the time interval is eligible for uplink skipping (e.g., based on a lack of uplink data during the time interval). In some examples, such as in response to receiving the request to switch the active BWP at the UE 415 to the second BWP, the UE 415 may transmit a signal during the time interval and via the second BWP. The signal that is transmitted may be based on whether the UE 415 applies the uplink skipping operation during the time interval.

In some examples, at 440, the UE 415 may determine that transmission of the reference signal is scheduled during the time interval. For example, the UE 415 may receive control information from the network entity 405 that schedules transmission of the reference signal during the time interval. That is, the network entity 405 (or another network entity) may schedule the UE 415 to transmit the reference signal (e.g., the SRS) during the PUSCH slot. In other words, the UE 415 may determine that transmission of the reference signal (e.g., an SRS) is scheduled on a same PUSCH slot as the uplink message.

In some examples, at 445, the UE 415 may apply the uplink skipping operation during the time interval. That is, the UE 415 may make use of the uplink skipping operation during the time interval, such that the UE 415 may conserve power during (e.g., after) the BWP switch. For example, the UE 415 may determine to skip (e.g., via the uplink skipping operation) the uplink message (e.g., a scheduled PUSCH transmission) during the time interval based on the lack of data and based on the UE 415 being scheduled to transmit the reference signal during the time interval. In other words, the UE 415 may apply the uplink skipping operation to the uplink message based on the time interval being after the switch and based on the UE 415 being scheduled to transmit the reference signal during the time interval (e.g., and based on the lack of uplink data).

In some examples, at 450, the UE 415 may transmit the reference signal during the time interval (e.g., and via the second BWP). In some examples, the reference signal (e.g., an SRS) may indicate that the switch from the first BWP to the second BWP was successful. That is, the UE 415 may transmit the reference signal (e.g., at 450) on the second BWP to inform the network entity 405 about the BWP switch (e.g., that the UE successfully switched the active BWP from the first BWP to the second BWP).

In some examples, at 455, the UE 415 may receive, via the second BWP, control information that schedules communication on the second BWP. The control information may be an example of control information illustrated by and described with reference to FIG. 3. For example, the control information may correspond to one or more DCIs. That is, the network entity 405 may transmit one or more DCIs (e.g., one or more DCIs that include downlink grants or one or more DCIs that include uplink grants) on the second BWP. In other words, the UE 415 may be scheduled to communicate on the second BWP (e.g., via the control information received at 455) based on the active BWP at the UE 415 being successfully switched from the first BWP to the second BWP. For example, the UE 415 may receive the control information at 455 based on (or in response to) transmission of the reference signal during the time interval (e.g., at 450). The scheduled communication on the second BWP may be a scheduled uplink transmission or a schedule downlink reception. That is, the control information may be a DCI that includes an uplink grant scheduling transmission of an uplink message or a DCI that includes a downlink grant scheduling reception of a downlink message.

In some examples, at 460, the UE 415 may participate in the communication via the second BWP in response to the control information received at 455. That is, the UE 415 may respond to the control information (e.g., the uplink grant or the downlink grant) on the second BWP. For example, the UE may transmit the uplink message to the network entity 405. Alternatively, the UE may receive the downlink message from the network entity 405. In some examples, by transmitting the reference signal at 450, the UE 415 may inform the network entity 405 of the BWP switch without a PUSCH transmission (e.g., based on a configuration), which may enable the UE 415 to conserve battery power, among other benefits.

Figure 5:
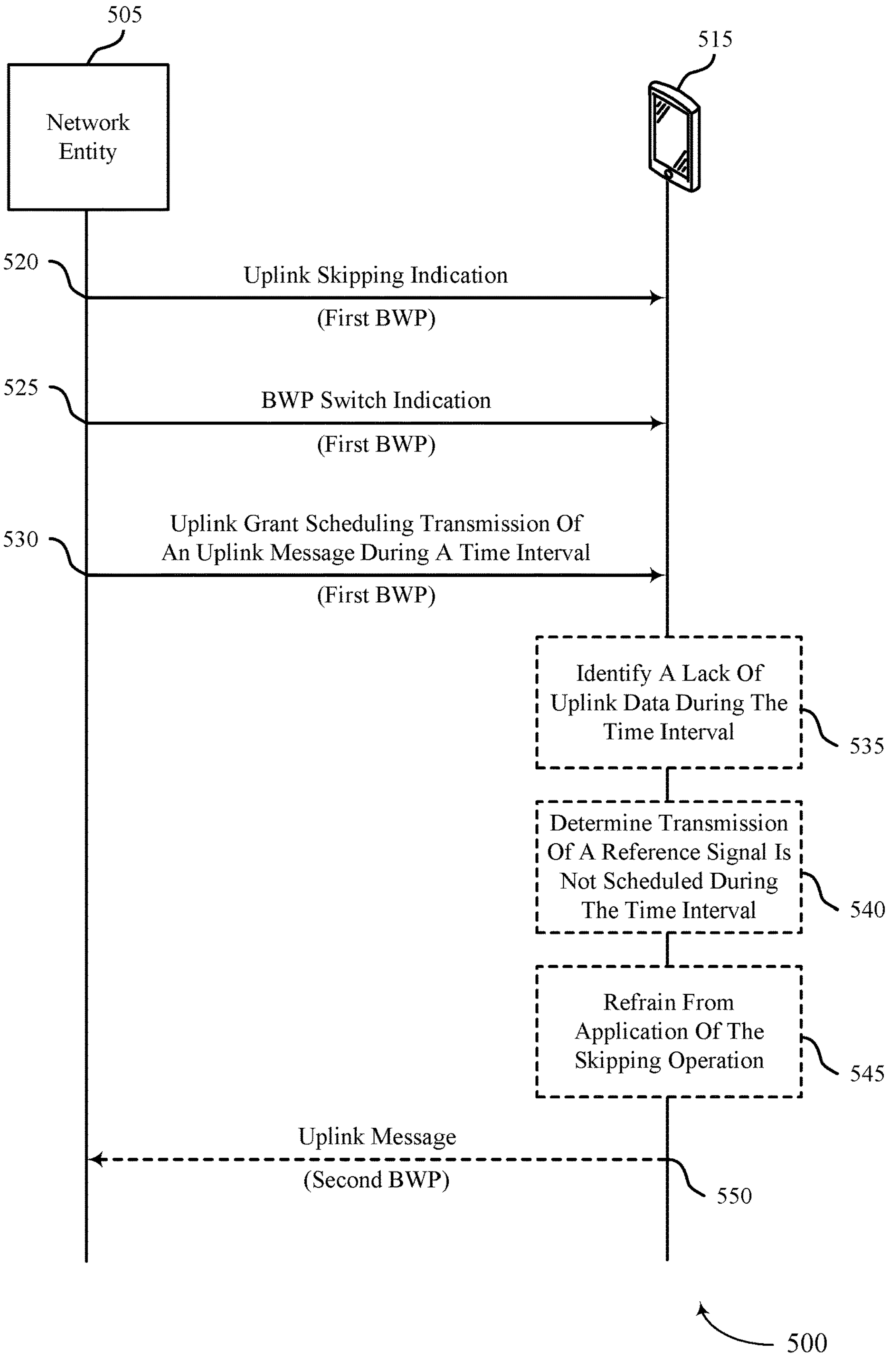

FIG. 5 shows an example of a process flow 500 that supports uplink transmission handling after a BWP switch for dynamic uplink skipping in accordance with one or more aspects of the present disclosure. In some examples, the process flow 500 may implement one or more aspects of wireless communications system 100, the wireless communications system 200, the BWP switching scheme 300, and the process flow 400. For example, the process flow 500 may include example operations associated a network entity 505 and a UE 515, which may be examples of the corresponding devices illustrated by and described with reference to FIGS. 1 through 4. The operations performed by the network entity 505 and the UE 515 may support improvements to communications between the UE 515 and the network entity 505, among other benefits. In the following description of the process flow 500, the operations between the UE 515 and the network entity 505 may occur in a different order than the example order shown. Additionally, or alternatively, the operations performed by the UE 515 and the network entity 505 may be performed in different orders or at different times. Some operations may also be omitted or combined. The UE 515 and the network entity 505 may support a framework for determining whether to apply an uplink skipping operation after a BWP switch.

At 520, the UE 515 may receive an uplink skipping indication via a first BWP. The uplink skipping indication may be an example of an uplink skipping indication illustrated by and described with reference to FIGS. 2 and 3. For example, the uplink skipping indication may include control information that enables the UE 515 to skip transmission of a scheduled uplink message via an uplink skipping operation. In some examples, the uplink skipping operation may enable the UE 515 to skip transmission of the scheduled uplink message based on a lack of uplink data at the UE 515.

At 525, the UE 515 may receive a BWP switch indication via the first BWP. The BWP switch indication may be an example of a BWP switch indication illustrated by and described with reference to FIGS. 2 and 3. For example, the BWP switch indication may include control information that requests the UE 515 to switch an active BWP at the UE 515 from the first BWP to a second BWP.

At 530, the UE 415 may receive an uplink grant via the first BWP. The uplink grant may be an example of an uplink grant illustrate by and described with reference to FIGS. 2 and 3. For example, the uplink grant (e.g., control information, such as a DCI) may schedule transmission of an uplink message at the UE 515 during a time interval. The uplink message may be an example of a PUSCH message. That is, the uplink grant may schedule transmission of the uplink message during the time interval and via the PUSCH. In some examples, application of the uplink skipping operation to the uplink message may be based on the time interval being after the switch. Additionally, application of the uplink skipping operation may be based on whether the UE 515 is scheduled to transmit a reference signal, such as an SRS, during the time interval.

In some examples, at 535, the UE 515 may identify a lack of uplink data during the time interval. In such examples, the UE 515 may determine that the time interval is eligible for uplink skipping (e.g., via the uplink skipping operation). In some examples, the UE 515 may transmit a signal during the time interval and via the second BWP. In such examples, the signal that is transmitted may be based on whether the UE 515 applies the uplink skipping operation during the time interval.

In some examples, at 540, the UE 515 may determine that transmission of the reference signal is not scheduled during the time interval. For example, the UE 515 may receive control information from the network entity 505 that schedules transmission of the reference signal during another time interval different from the time interval.

In some examples, at 545, the UE 515 may refrain from application of the uplink skipping operation during the time interval. That is, the UE 515 may refrain from applying the uplink sipping operation during the time interval. In some examples, the UE 515 may refrain from applying the uplink skipping operation during the time interval based on determining that transmission of the reference signal is not scheduled during the time interval. That is, the uplink skipping operation is not applied during the time interval based on the reference signal not being scheduled for transmission during the time interval (e.g., and irrespective of the time interval being eligible for application of the uplink skipping operation based on the lack of uplink data at the UE 515 during the time interval).

In some examples, at 550, the UE 515 may transmit the uplink message during the time interval (e.g., and via the second BWP). In some examples, the uplink message may indicate that the switch from the first BWP to the second BWP was successful. That is, the UE 515 may transmit the uplink message on the second BWP irrespective of the lack of uplink data, such that the UE 515 may inform the network entity 505 about the BWP switch (e.g., that the UE 515 successfully switched the active BWP from the first BWP to the second BWP). In some examples, informing the network entity 405 of the BWP switch may reduce latency and increase a reliability of wireless communications between the UE 515 and the network entity 505, among other benefits.

Figure 6:
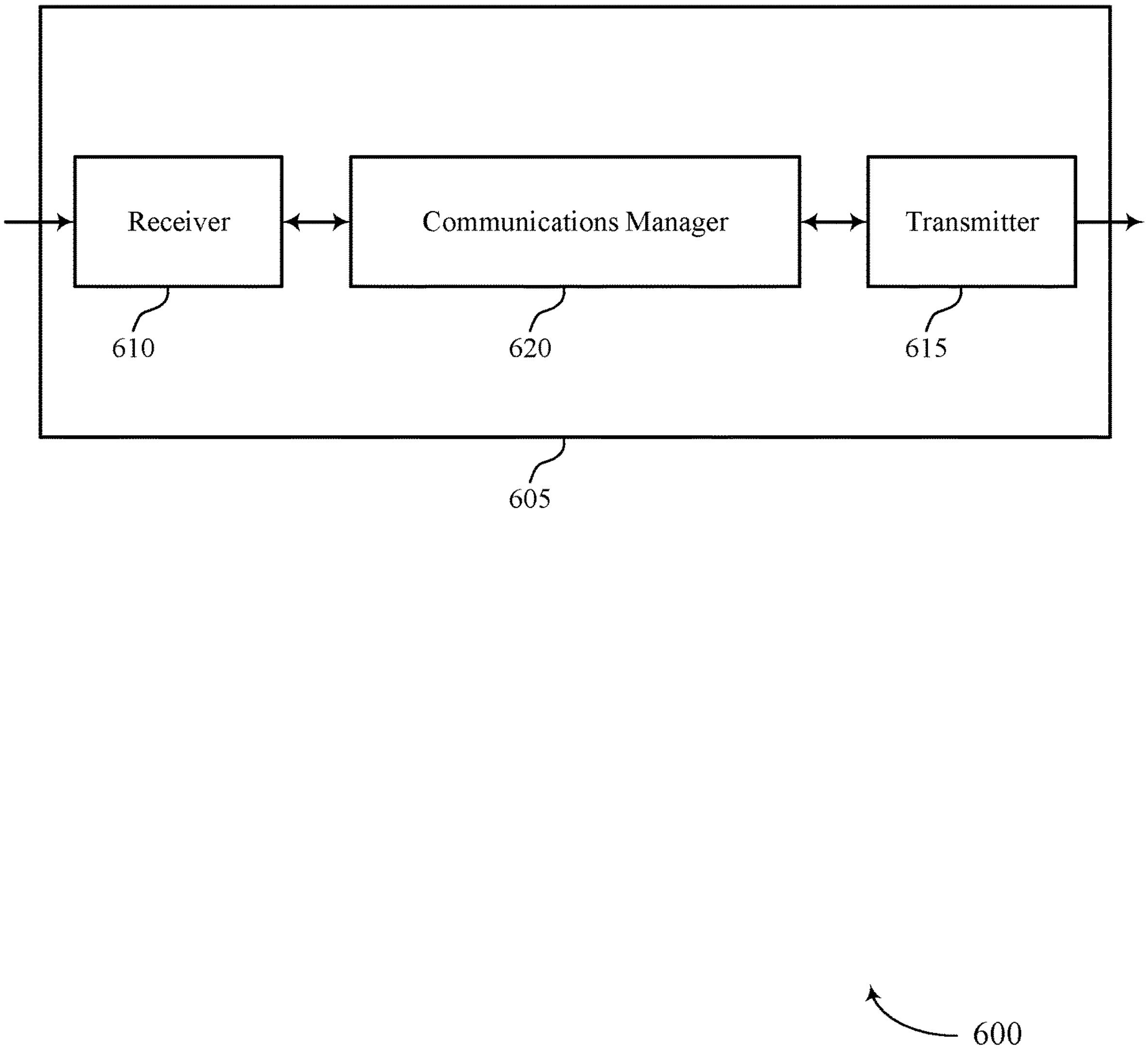
FIGS. 6 and 7 show block diagrams of devices that support uplink transmission handling after a BWP switch for dynamic uplink skipping in accordance with one or more aspects of the present disclosure.

FIG. 6 shows a block diagram 600 of a device 605 that supports uplink transmission handling after a BWP switch for dynamic uplink skipping in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink transmission handling after a BWP switch for dynamic uplink skipping). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink transmission handling after a BWP switch for dynamic uplink skipping). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of uplink transmission handling after a BWP switch for dynamic uplink skipping as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication performed by a network node (e.g., the device 605) in accordance with examples as disclosed herein. For example, the communications manager 620 is capable of, configured to, or operable to support a means for receiving, via a first BWP, first control information that enables the network node to skip transmission of a scheduled uplink message via an uplink skipping operation. The communications manager 620 is capable of, configured to, or operable to support a means for receiving, via the first BWP, second control information that requests the network node to switch an active BWP at the network node from the first BWP to a second BWP. The communications manager 620 is capable of, configured to, or operable to support a means for receiving, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval. The communications manager 620 is capable of, configured to, or operable to support a means for transmitting a signal during the time interval and via the second BWP, where the signal that is transmitted is based on whether the network node applies the uplink skipping operation during the time interval.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption and more efficient utilization of communication resources.

Figure 7:
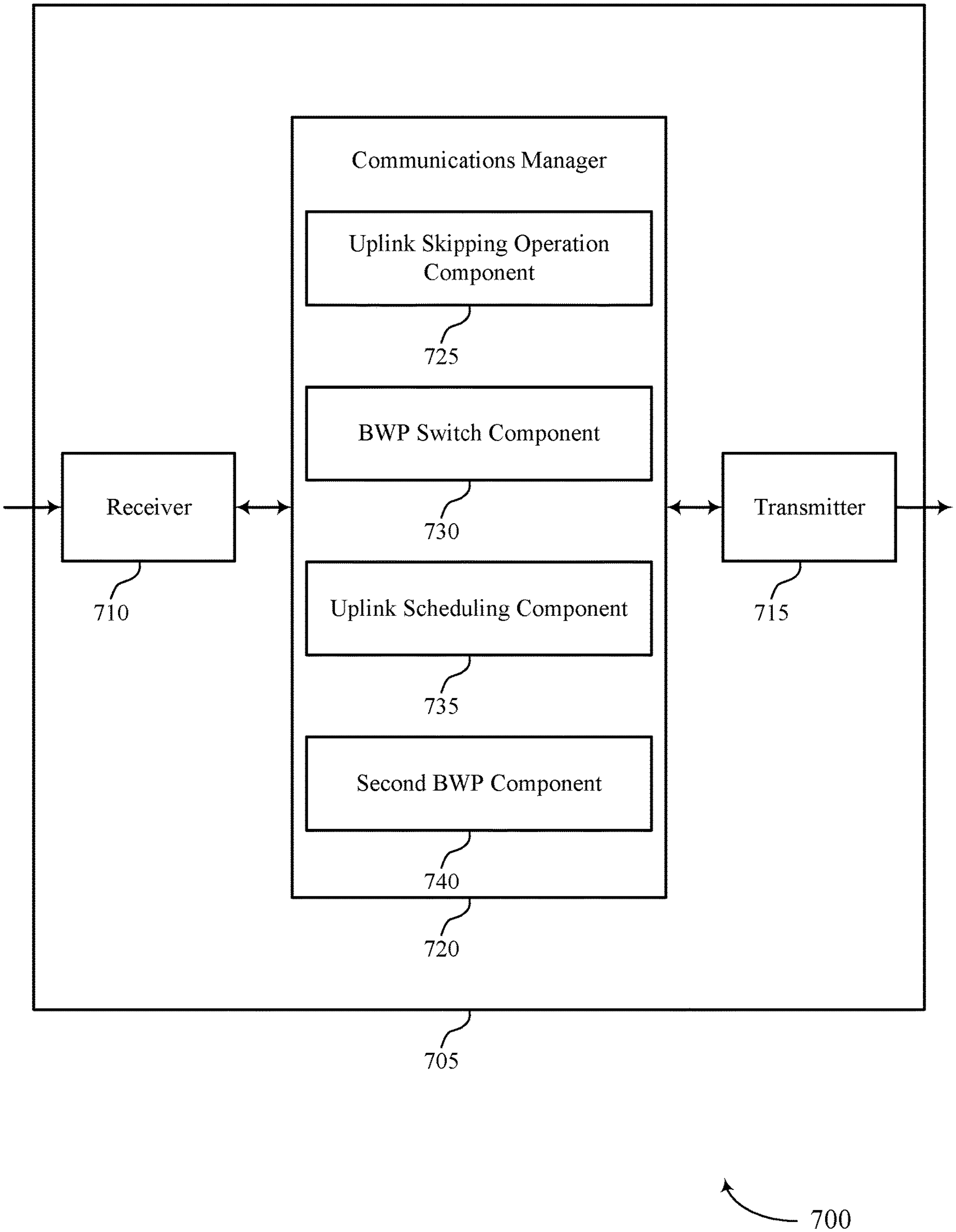

FIG. 7 shows a block diagram 700 of a device 705 that supports uplink transmission handling after a BWP switch for dynamic uplink skipping in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink transmission handling after a BWP switch for dynamic uplink skipping). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink transmission handling after a BWP switch for dynamic uplink skipping). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of uplink transmission handling after a BWP switch for dynamic uplink skipping as described herein. For example, the communications manager 720 may include an uplink skipping operation component 725, a BWP switch component 730, an uplink scheduling component 735, a second BWP component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a network node (e.g., the device 705) in accordance with examples as disclosed herein. The uplink skipping operation component 725 is capable of, configured to, or operable to support a means for receiving, via a first BWP, first control information that enables the network node to skip transmission of a scheduled uplink message via an uplink skipping operation. The BWP switch component 730 is capable of, configured to, or operable to support a means for receiving, via the first BWP, second control information that requests the network node to switch an active BWP at the network node from the first BWP to a second BWP. The uplink scheduling component 735 is capable of, configured to, or operable to support a means for receiving, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval. The second BWP component 740 is capable of, configured to, or operable to support a means for transmitting a signal during the time interval and via the second BWP, where the signal that is transmitted is based on whether the network node applies the uplink skipping operation during the time interval.

Figure 8:
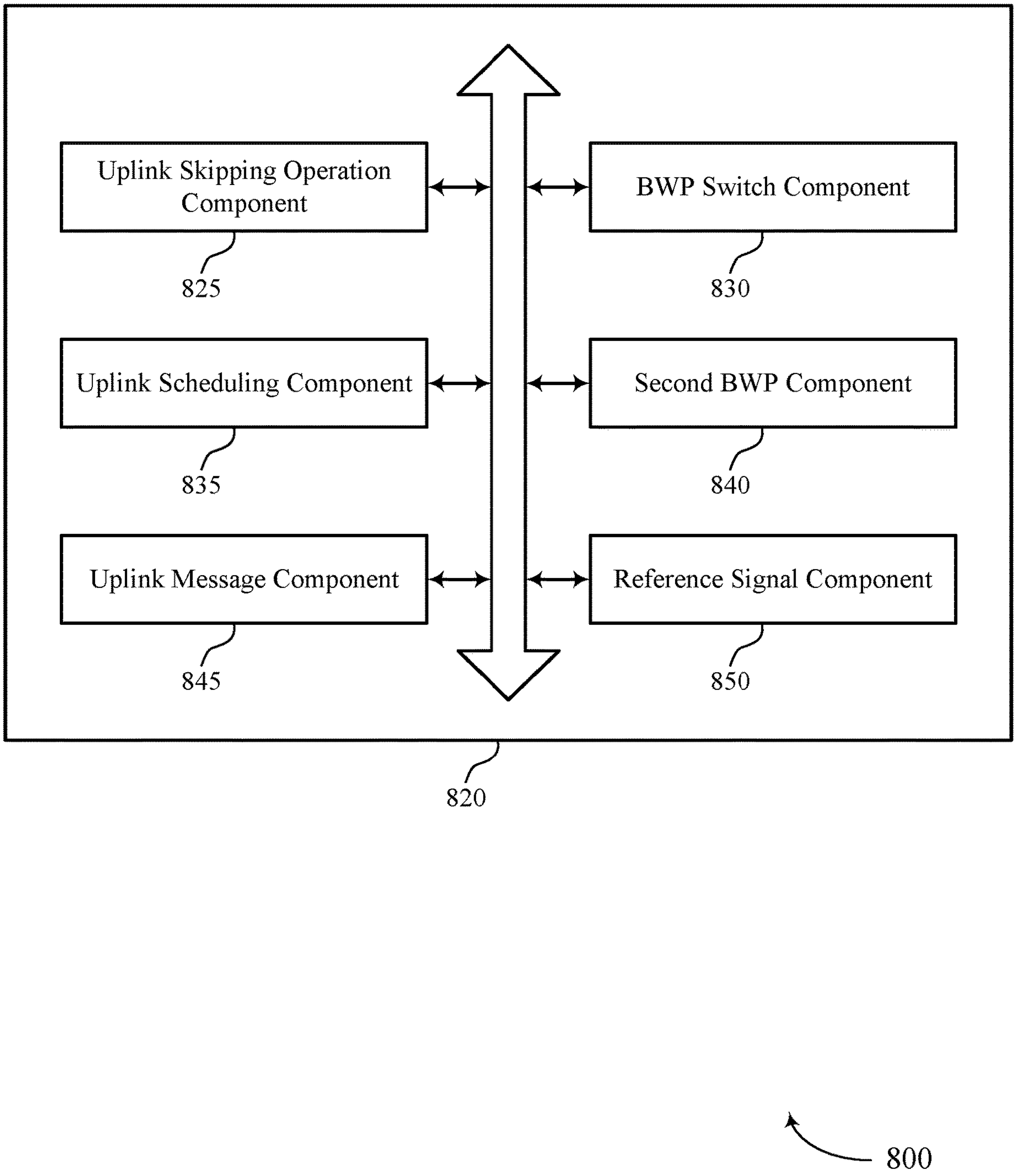
FIG. 8 shows a block diagram of a communications manager that supports uplink transmission handling after a BWP switch for dynamic uplink skipping in accordance with one or more aspects of the present disclosure.

FIG. 8 shows a block diagram 800 of a communications manager 820 that supports uplink transmission handling after a BWP switch for dynamic uplink skipping in accordance with one or more aspects of the present disclosure. The communications manager 820 may be an example of aspects of a communications manager 620, a communications manager 720, or both, as described herein. The communications manager 820, or various components thereof, may be an example of means for performing various aspects of uplink transmission handling after a BWP switch for dynamic uplink skipping as described herein. For example, the communications manager 820 may include an uplink skipping operation component 825, a BWP switch component 830, an uplink scheduling component 835, a second BWP component 840, an uplink message component 845, a reference signal component 850, or any combination thereof. Each of these components may communicate, directly or indirectly, with one another (e.g., via one or more buses).

The communications manager 820 may support wireless communication at a network node (e.g., a UE) in accordance with examples as disclosed herein. The uplink skipping operation component 825 is capable of, configured to, or operable to support a means for receiving, via a first BWP, first control information that enables the network node to skip transmission of a scheduled uplink message via an uplink skipping operation. The BWP switch component 830 is capable of, configured to, or operable to support a means for receiving, via the first BWP, second control information that requests the network node to switch an active BWP at the network node from the first BWP to a second BWP. The uplink scheduling component 835 is capable of, configured to, or operable to support a means for receiving, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval. The second BWP component 840 is capable of, configured to, or operable to support a means for transmitting a signal during the time interval and via the second BWP, where the signal that is transmitted is based on whether the network node applies the uplink skipping operation during the time interval.

In some examples, to support transmitting the signal, the uplink skipping operation component 825 is capable of, configured to, or operable to support a means for refraining from application of the uplink skipping operation during the time interval. In some examples, to support transmitting the signal, the uplink message component 845 is capable of, configured to, or operable to support a means for transmitting the uplink message during the time interval, where the signal is the uplink message. In some examples, the uplink skipping operation is not applied during the time interval based on the reference signal not being scheduled for transmission during the time interval.

In some examples, to support transmitting the signal, the uplink skipping operation component 825 is capable of, configured to, or operable to support a means for applying the uplink skipping operation during the time interval. In some examples, to support transmitting the signal, the reference signal component 850 is capable of, configured to, or operable to support a means for transmitting the reference signal during the time interval, where the signal is the reference signal. In some examples, application of the uplink skipping operation during the time interval is based on the network node being scheduled to transmit the reference signal during the time interval.

In some examples, the uplink skipping operation enables the network node to skip transmission of the scheduled uplink message based on a lack of uplink data at the network node during the time interval. In some examples, transmission of the signal via the second BWP indicates that the network node successfully switched the active BWP at the network node from the first BWP to the second BWP.

In some examples, the uplink scheduling component 835 is capable of, configured to, or operable to support a means for receiving, via the second BWP, fourth control information that schedules communication on the second BWP based on the active BWP at the network node being successfully switched from the first BWP to the second BWP.

In some examples, the second BWP component 840 is capable of, configured to, or operable to support a means for participating in the communication via the second BWP in response to the fourth control information. In some examples, the uplink message includes a PUSCH message. In some examples, the reference signal includes an SRS.

Figure 9:
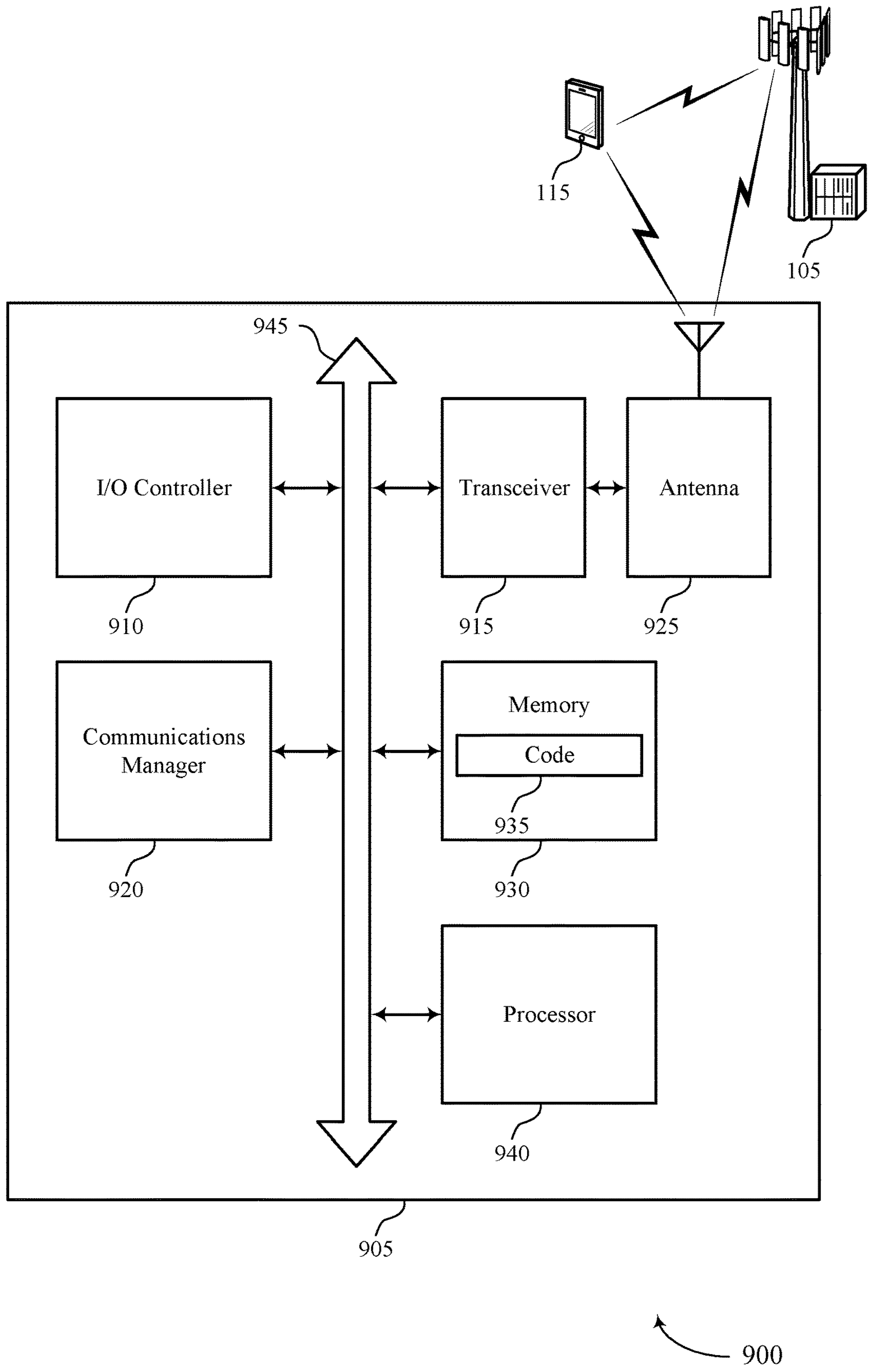
FIG. 9 shows a diagram of a system including a device that supports uplink transmission handling after a BWP switch for dynamic uplink skipping in accordance with one or more aspects of the present disclosure.

FIG. 9 shows a diagram of a system 900 including a device 905 that supports uplink transmission handling after a BWP switch for dynamic uplink skipping in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink transmission handling after a BWP switch for dynamic uplink skipping). For example, the device 905 or a component of the device 905 may include a processor 940 and memory 930 coupled with or to the processor 940, the processor 940 and memory 930 configured to perform various functions described herein.

The communications manager 920 may support wireless communication at a network node (e.g., the device 905) in accordance with examples as disclosed herein. For example, the communications manager 920 is capable of, configured to, or operable to support a means for receiving, via a first BWP, first control information that enables the network node to skip transmission of a scheduled uplink message via an uplink skipping operation. The communications manager 920 is capable of, configured to, or operable to support a means for receiving, via the first BWP, second control information that requests the network node to switch an active BWP at the network node from the first BWP to a second BWP. The communications manager 920 is capable of, configured to, or operable to support a means for receiving, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval. The communications manager 920 is capable of, configured to, or operable to support a means for transmitting a signal during the time interval and via the second BWP, where the signal that is transmitted is based on whether the network node applies the uplink skipping operation during the time interval.

By including or configuring the communications manager 920 in accordance with examples as described herein, the device 905 may support techniques for reduced power consumption, more efficient utilization of communication resources, improved coordination between devices, and longer battery life.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of uplink transmission handling after a BWP switch for dynamic uplink skipping as described herein, or the processor 940 and the memory 930 may be otherwise configured to perform or support such operations.

Figure 10:
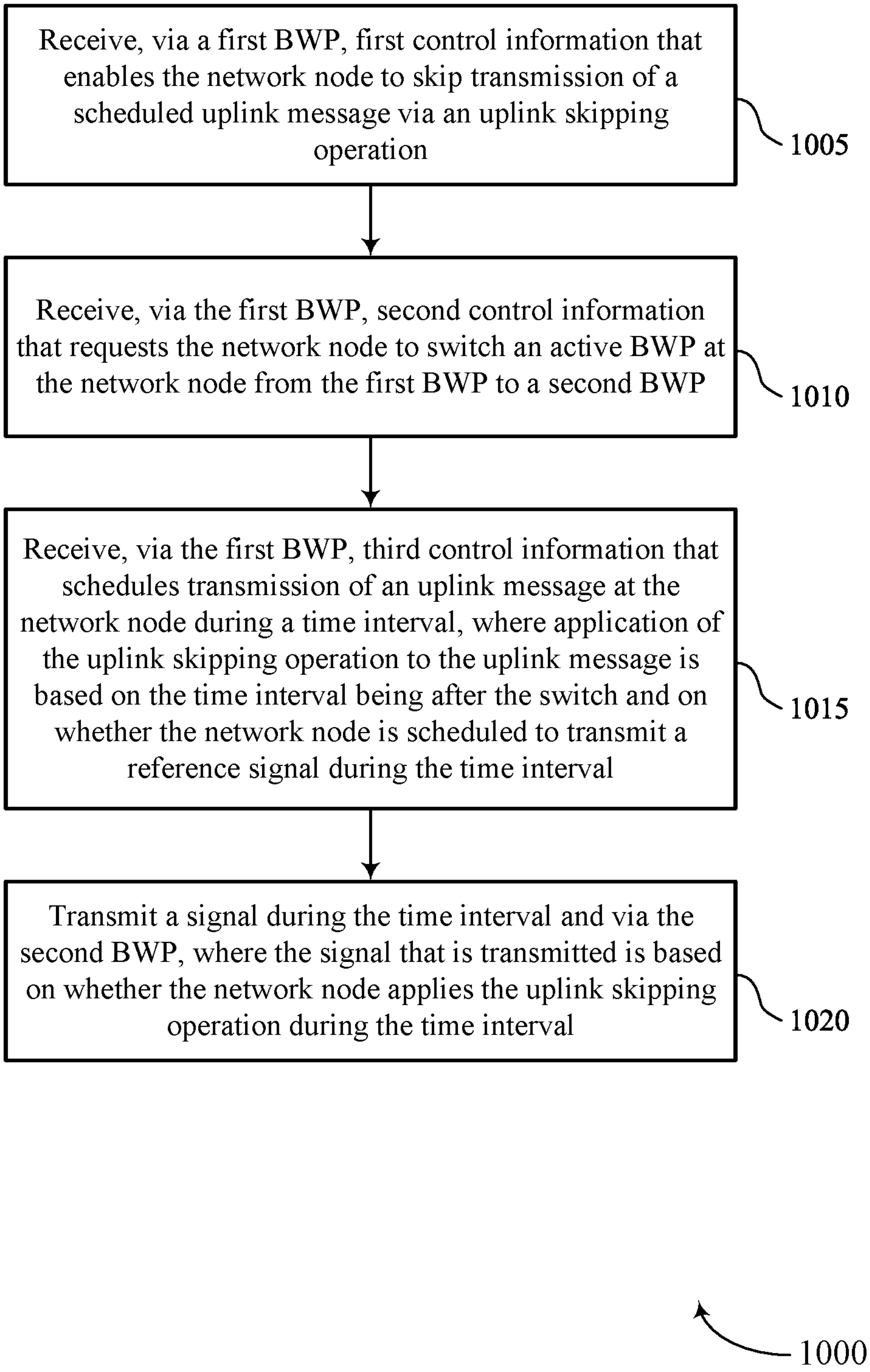
FIGS. 10 through 12 show flowcharts illustrating methods that support uplink transmission handling after a BWP switch for dynamic uplink skipping in accordance with one or more aspects of the present disclosure.

FIG. 10 shows a flowchart illustrating a method 1000 that supports uplink transmission handling after a BWP switch for dynamic uplink skipping in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1005, the method may include receiving, via a first BWP, first control information that enables the network node to skip transmission of a scheduled uplink message via an uplink skipping operation. The operations of 1005 may be performed in accordance with examples as disclosed herein. In some examples, aspects of the operations of 1005 may be performed by an uplink skipping operation component 825 as described with reference to FIG. 8.

At 1010, the method may include receiving, via the first BWP, second control information that requests the network node to switch an active BWP at the network node from the first BWP to a second BWP. The operations of 1010 may be performed in accordance with examples as disclosed herein. In some examples, aspects of the operations of 1010 may be performed by a BWP switch component 830 as described with reference to FIG. 8.

At 1015, the method may include receiving, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval. The operations of 1015 may be performed in accordance with examples as disclosed herein. In some examples, aspects of the operations of 1015 may be performed by an uplink scheduling component 835 as described with reference to FIG. 8.

At 1020, the method may include transmitting a signal during the time interval and via the second BWP, where the signal that is transmitted is based on whether the network node applies the uplink skipping operation during the time interval. The operations of 1020 may be performed in accordance with examples as disclosed herein. In some examples, aspects of the operations of 1020 may be performed by a second BWP component 840 as described with reference to FIG. 8.

Figure 11:
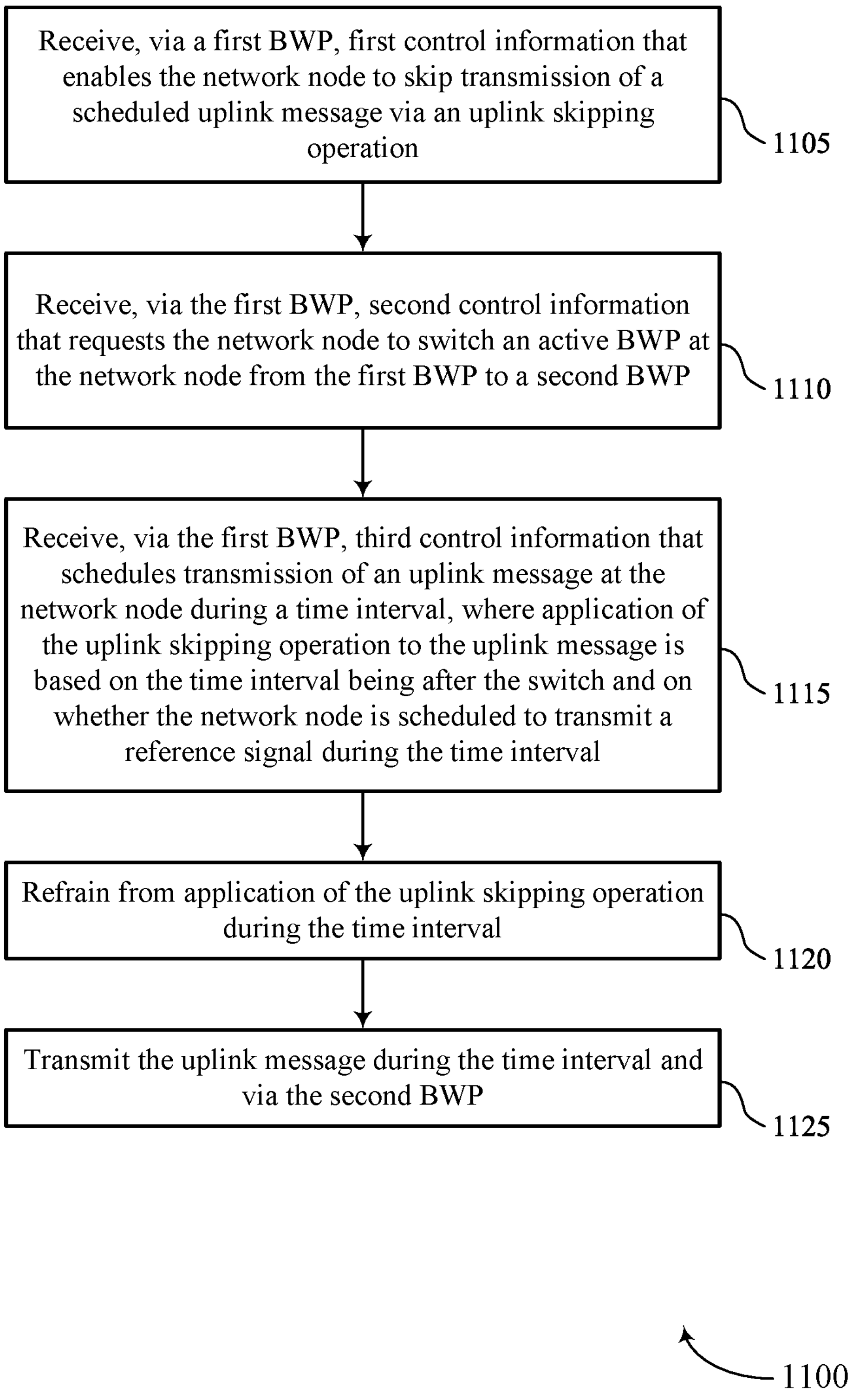

FIG. 11 shows a flowchart illustrating a method 1100 that supports uplink transmission handling after a BWP switch for dynamic uplink skipping in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1105, the method may include receiving, via a first BWP, first control information that enables the network node to skip transmission of a scheduled uplink message via an uplink skipping operation. The operations of 1105 may be performed in accordance with examples as disclosed herein. In some examples, aspects of the operations of 1105 may be performed by an uplink skipping operation component 825 as described with reference to FIG. 8.

At 1110, the method may include receiving, via the first BWP, second control information that requests the network node to switch an active BWP at the network node from the first BWP to a second BWP. The operations of 1110 may be performed in accordance with examples as disclosed herein. In some examples, aspects of the operations of 1110 may be performed by a BWP switch component 830 as described with reference to FIG. 8.

At 1115, the method may include receiving, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval. The operations of 1115 may be performed in accordance with examples as disclosed herein. In some examples, aspects of the operations of 1115 may be performed by an uplink scheduling component 835 as described with reference to FIG. 8.

At 1120, the method may include refraining from application of the uplink skipping operation during the time interval. The operations of 1120 may be performed in accordance with examples as disclosed herein. In some examples, aspects of the operations of 1120 may be performed by an uplink skipping operation component 825 as described with reference to FIG. 8.

At 1125, the method may include transmitting the uplink message during the time interval and via the second BWP. The operations of 1125 may be performed in accordance with examples as disclosed herein. In some examples, aspects of the operations of 1125 may be performed by an uplink message component 845 as described with reference to FIG. 8.

Figure 12:
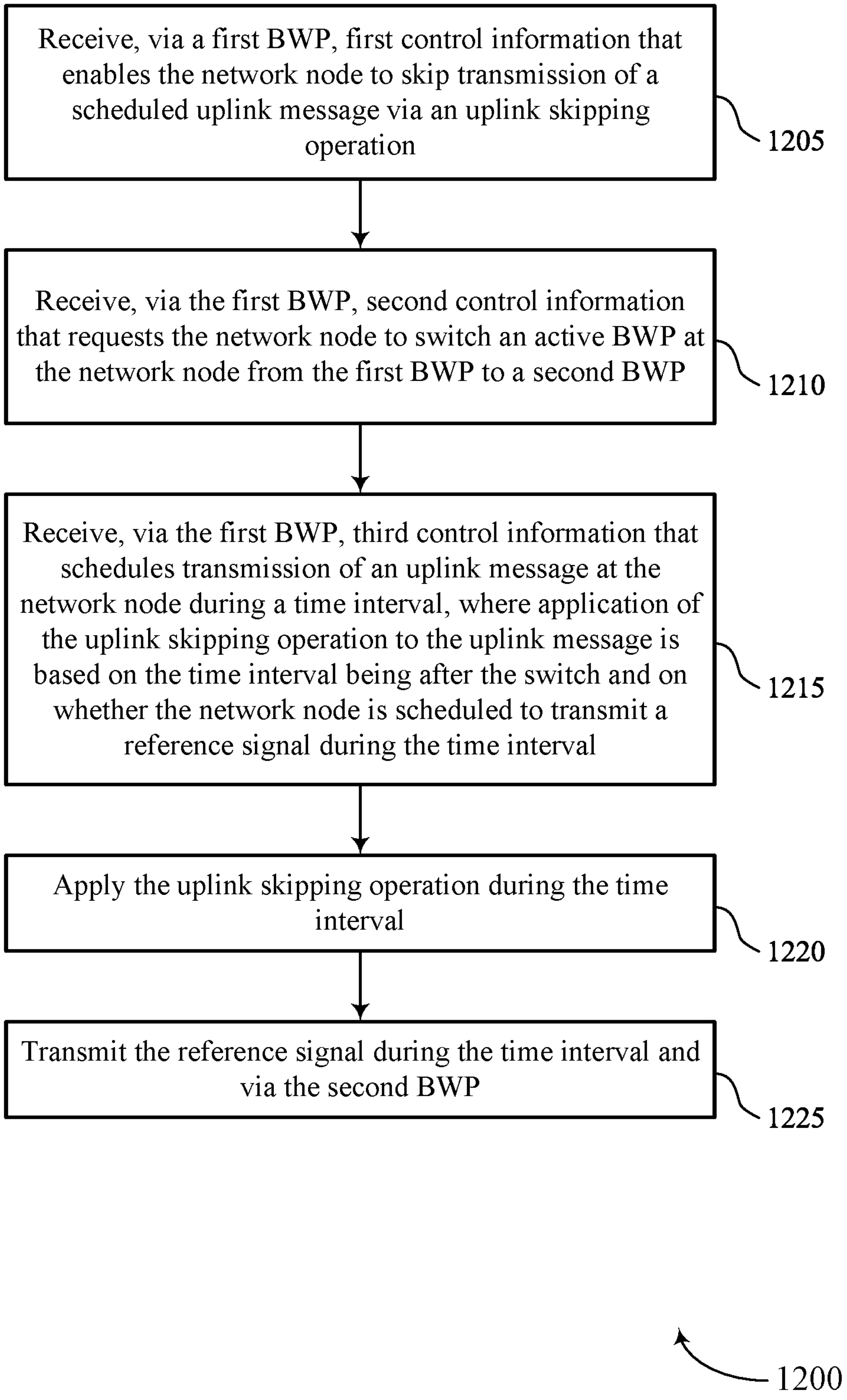

FIG. 12 shows a flowchart illustrating a method 1200 that supports uplink transmission handling after a BWP switch for dynamic uplink skipping in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1205, the method may include receiving, via a first BWP, first control information that enables the network node to skip transmission of a scheduled uplink message via an uplink skipping operation. The operations of 1205 may be performed in accordance with examples as disclosed herein. In some examples, aspects of the operations of 1205 may be performed by an uplink skipping operation component 825 as described with reference to FIG. 8.

At 1210, the method may include receiving, via the first BWP, second control information that requests the network node to switch an active BWP at the network node from the first BWP to a second BWP. The operations of 1210 may be performed in accordance with examples as disclosed herein. In some examples, aspects of the operations of 1210 may be performed by a BWP switch component 830 as described with reference to FIG. 8.

At 1215, the method may include receiving, via the first BWP, third control information that schedules transmission of an uplink message at the network node during a time interval, where application of the uplink skipping operation to the uplink message is based on the time interval being after the switch and on whether the network node is scheduled to transmit a reference signal during the time interval. The operations of 1215 may be performed in accordance with examples as disclosed herein. In some examples, aspects of the operations of 1215 may be performed by an uplink scheduling component 835 as described with reference to FIG. 8.

At 1220, the method may include applying the uplink skipping operation during the time interval. The operations of 1220 may be performed in accordance with examples as disclosed herein. In some examples, aspects of the operations of 1220 may be performed by an uplink skipping operation component 825 as described with reference to FIG. 8.

At 1225, the method may include transmitting the reference signal during the time interval and via the second BWP. The operations of 1225 may be performed in accordance with examples as disclosed herein. In some examples, aspects of the operations of 1225 may be performed by a reference signal component 850 as described with reference to FIG. 8.

The following provides an overview of aspects of the present disclosure:

Aspect 1: A method of wireless communication performed by a network node, comprising: receiving, via a first BWP, first control information that enables the network node to skip transmission of a scheduled uplink message via an uplink skipping operation; receiving, via the first BWP, second control information that requests the network node to switch an active BWP at the network node from the first BWP to a second BWP; receiving, via the first BWP, third control information that schedules transmission of an uplink message at the network node during a time interval, wherein application of the uplink skipping operation to the uplink message is based on the time interval being after the switch and on whether the network node is scheduled to transmit a reference signal during the time interval; and transmitting a signal during the time interval and via the second BWP, wherein the signal that is transmitted is based on whether the network node applies the uplink skipping operation during the time interval.

Aspect 2: The method of aspect 1, wherein transmitting the signal comprises: refraining from application of the uplink skipping operation during the time interval; and transmitting the uplink message during the time interval, wherein the signal is the uplink message.

Aspect 3: The method of aspect 2, wherein the uplink skipping operation is not applied during the time interval based on the reference signal not being scheduled for transmission during the time interval.

Aspect 4: The method of aspect 1, wherein transmitting the signal comprises: applying the uplink skipping operation during the time interval; and transmitting the reference signal during the time interval, wherein the signal is the reference signal.

Aspect 5: The method of aspect 4, wherein application of the uplink skipping operation during the time interval is based on the network node being scheduled to transmit the reference signal during the time interval.

Aspect 6: The method of any of aspects 1 through 5, wherein the uplink skipping operation enables the network node to skip transmission of the scheduled uplink message based on a lack of uplink data at the network node during the time interval.

Aspect 7: The method claim 1, wherein transmission of the signal via the second BWP indicates that the network node successfully switched the active BWP at the network node from the first BWP to the second BWP.

Aspect 8: The method of any of aspects 1 through 7, further comprising: receiving, via the second BWP, fourth control information that schedules communication on the second BWP based on the active BWP at the network node being successfully switched from the first BWP to the second BWP.

Aspect 9: The method of aspect 8, further comprising: participating in the communication via the second BWP in response to the fourth control information.

Aspect 10: The method of any of aspects 1 through 9, wherein the uplink message comprises a PUSCH message.

Aspect 11: The method of any of aspects 1 through 10, wherein the reference signal comprises an SRS.

Aspect 12: A network node for wireless communication, comprising a memory; and at least one processor coupled to the memory, wherein the at least one processor is configured to perform a method of any of aspects 1 through 11.

Aspect 13: An apparatus for wireless communication at a network node, comprising at least one means for performing a method of any of aspects 1 through 11.

Aspect 14: A non-transitory computer-readable medium having code for wireless communication stored thereon that, when executed by a network node, causes the network node to perform a method of any of aspects 1 through 11.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term “or” is an inclusive “or” unless limiting language is used relative to the alternatives listed. For example, reference to “X being based on A or B” shall be construed as including within its scope X being based on A, X being based on B, and X being based on A and B. In this regard, reference to “X being based on A or B” refers to “at least one of A or B” or “one or more of A or B” due to “or” being inclusive. Similarly, reference to “X being based on A, B, or C” shall be construed as including within its scope X being based on A, X being based on B, X being based on C, X being based on A and B, X being based on A and C, X being based on B and C, and X being based on A, B, and C. In this regard, reference to “X being based on A, B, or C” refers to “at least one of A, B, or C” or “one or more of A, B, or C” due to “or” being inclusive. As an example of limiting language, reference to “X being based on only one of A or B” shall be construed as including within its scope X being based on A as well as X being based on B, but not X being based on A and B. Also, as used herein, the phrase “based on” shall not be construed as a reference to a closed set of information, one or more conditions, one or more factors, or the like. In other words, the phrase “based on A” (where “A” may be information, a condition, a factor, or the like) shall be construed as “based at least on A” unless specifically recited differently. Also, as used herein, the phrase “a set” shall be construed as including the possibility of a set with one member. That is, the phrase “a set” shall be construed in the same manner as “one or more” or “at least one of.”

The term “determine” or “determining” encompasses a variety of actions and, therefore, “determining” can include calculating, computing, processing, deriving, investigating, looking up (such as via looking up in a table, a database or another data structure), ascertaining and the like. Also, “determining” can include receiving (e.g., receiving information), accessing (e.g., accessing data stored in memory) and the like. Also, “determining” can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term “aspect” or “example” used herein means “serving as an aspect, example, instance, or illustration,” and not “preferred” or “advantageous over other aspects.” The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network node for wireless communication, comprising:
- a memory; and
- at least one processor coupled to the memory, wherein the at least one processor is configured to:
  - receive, via a first bandwidth part, first control information that enables the network node to skip transmission of a scheduled uplink message via an uplink skipping operation;
  - receive, via the first bandwidth part, second control information that requests the network node to switch an active bandwidth part at the network node from the first bandwidth part to a second bandwidth part;
  - receive, via the first bandwidth part, third control information that schedules transmission of an uplink message at the network node during a time interval, wherein application of the uplink skipping operation to the uplink message is based on the time interval being after the switch and on whether the network node is scheduled to transmit a reference signal during the time interval; and
  - transmit a signal during the time interval and via the second bandwidth part, wherein the signal that is transmitted is based on whether the network node applies the uplink skipping operation during the time interval.

2. The network node of claim 1, wherein, to transmit the signal, the at least one processor is configured to:
- refrain from application of the uplink skipping operation during the time interval; and
- transmit the uplink message during the time interval, wherein the signal is the uplink message.

3. The network node of claim 2, wherein the uplink skipping operation is not applied during the time interval based on the reference signal not being scheduled for transmission during the time interval.

4. The network node of claim 1, wherein, to transmit the signal, the at least one processor is configured to:
- apply the uplink skipping operation during the time interval; and
- transmit the reference signal during the time interval, wherein the signal is the reference signal.

5. The network node of claim 4, wherein application of the uplink skipping operation during the time interval is based on the network node being scheduled to transmit the reference signal during the time interval.

6. The network node of claim 1, wherein the uplink skipping operation enables the network node to skip transmission of the scheduled uplink message based on a lack of uplink data at the network node during the time interval.

7. The network node of claim 1, wherein transmission of the signal via the second bandwidth part indicates that the network node successfully switched the active bandwidth part at the network node from the first bandwidth part to the second bandwidth part.

8. The network node of claim 1, wherein the at least one processor is further configured to:
- receive, via the second bandwidth part, fourth control information that schedules communication on the second bandwidth part based on the active bandwidth part at the network node being successfully switched from the first bandwidth part to the second bandwidth part.

9. The network node of claim 8, wherein the at least one processor is further configured to:
- participate in the communication via the second bandwidth part in response to the fourth control information.

10. The network node of claim 1, wherein the uplink message comprises a physical uplink shared channel message.

11. The network node of claim 1, wherein the reference signal comprises a sounding reference signal.

12. A method of wireless communication performed by a network node, comprising:
- receiving, via a first bandwidth part, first control information that enables the network node to skip transmission of a scheduled uplink message via an uplink skipping operation;
- receiving, via the first bandwidth part, second control information that requests the network node to switch an active bandwidth part at the network node from the first bandwidth part to a second bandwidth part;
- receiving, via the first bandwidth part, third control information that schedules transmission of an uplink message at the network node during a time interval, wherein application of the uplink skipping operation to the uplink message is based on the time interval being after the switch and on whether the network node is scheduled to transmit a reference signal during the time interval; and transmitting a signal during the time interval and via the second bandwidth part, wherein the signal that is transmitted is based on whether the network node applies the uplink skipping operation during the time interval.

13. The method of claim 12, wherein transmitting the signal comprises:

refraining from application of the uplink skipping operation during the time interval; and transmitting the uplink message during the time interval, wherein the signal is the uplink message.

14. The method of claim 13, wherein the uplink skipping operation is not applied during the time interval based on the reference signal not being scheduled for transmission during the time interval.

15. The method of claim 12, wherein transmitting the signal comprises:

applying the uplink skipping operation during the time interval; and transmitting the reference signal during the time interval, wherein the signal is the reference signal.

16. The method of claim 15, wherein application of the uplink skipping operation during the time interval is based on the network node being scheduled to transmit the reference signal during the time interval.

17. The method of claim 12, wherein the uplink skipping operation enables the network node to skip transmission of the scheduled uplink message based on a lack of uplink data at the network node during the time interval.

18. The method of claim 12, wherein transmission of the signal via the second bandwidth part indicates that the network node successfully switched the active bandwidth part at the network node from the first bandwidth part to the second bandwidth part.

19. The method of claim 12, further comprising:

receiving, via the second bandwidth part, fourth control information that schedules communication on the second bandwidth part based on the active bandwidth part at the network node being successfully switched from the first bandwidth part to the second bandwidth part.

20. The method of claim 19, further comprising:

participating in the communication via the second bandwidth part in response to the fourth control information.

21. The method of claim 12, wherein the uplink message comprises a physical uplink shared channel message.

22. The method of claim 12, wherein the reference signal comprises a sounding reference signal.

23. An apparatus for wireless communication, comprising:

means for receiving, via a first bandwidth part, first control information that enables a network node to skip transmission of a scheduled uplink message via an uplink skipping operation;

means for receiving, via the first bandwidth part, second control information that requests the network node to switch an active bandwidth part at the network node from the first bandwidth part to a second bandwidth part;

means for receiving, via the first bandwidth part, third control information that schedules transmission of an uplink message at the network node during a time interval, wherein application of the uplink skipping operation to the uplink message is based on the time interval being after the switch and on whether the network node is scheduled to transmit a reference signal during the time interval; and means for transmitting a signal during the time interval and via the second bandwidth part, wherein the signal that is transmitted is based on whether the network node applies the uplink skipping operation during the time interval.

24. The apparatus of claim 23, wherein the means for transmitting the signal comprise:

means for refraining from application of the uplink skipping operation during the time interval; and means for transmitting the uplink message during the time interval, wherein the signal is the uplink message.

25. The apparatus of claim 24, wherein the uplink skipping operation is not applied during the time interval based on the reference signal not being scheduled for transmission during the time interval.

26. The apparatus of claim 23, wherein the means for transmitting the signal comprise:

means for applying the uplink skipping operation during the time interval; and means for transmitting the reference signal during the time interval, wherein the signal is the reference signal.

27. The apparatus of claim 26, wherein application of the uplink skipping operation during the time interval is based on the network node being scheduled to transmit the reference signal during the time interval.

28. A non-transitory computer-readable medium having code for wireless communication stored thereon that, when executed by a network node, causes the network node to:

receive, via a first bandwidth part, first control information that enables the network node to skip transmission of a scheduled uplink message via an uplink skipping operation;

receive, via the first bandwidth part, second control information that requests the network node to switch an active bandwidth part at the network node from the first bandwidth part to a second bandwidth part;

receive, via the first bandwidth part, third control information that schedules transmission of an uplink message at the network node during a time interval, wherein application of the uplink skipping operation to the uplink message is based on the time interval being after the switch and on whether the network node is scheduled to transmit a reference signal during the time interval; and transmit a signal during the time interval and via the second bandwidth part, wherein the signal that is transmitted is based on whether the network node applies the uplink skipping operation during the time interval.

29. The non-transitory computer-readable medium of claim 28, wherein the code, when executed by the network node, causes the network node to:

refrain from application of the uplink skipping operation during the time interval; and transmit the uplink message during the time interval, wherein the signal is the uplink message.

30. The non-transitory computer-readable medium of claim 28, wherein the code, when executed by the network node, causes the network node to:

apply the uplink skipping operation during the time interval; and transmit the reference signal during the time interval, wherein the signal is the reference signal.

* * * * *